United States Patent
Abraham et al.

(10) Patent No.: US 10,235,720 B2
(45) Date of Patent: Mar. 19, 2019

(54) MERCHANT IDENTIFICATION AND EXPENSE ITEM CLASSIFICATION FROM A MOBILE DEVICE CAPTURE OF AN EVENT RECEIPT

(71) Applicant: Oracle International Corporation, Redwood Shores, CA (US)

(72) Inventors: Elizabeth Dawn Abraham, Foster City, CA (US); Satish Pandurang Prabhu, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 698 days.

(21) Appl. No.: 14/922,044

(22) Filed: Oct. 23, 2015

(65) Prior Publication Data
US 2017/0116679 A1    Apr. 27, 2017

(51) Int. Cl.
*G06Q 40/00* (2012.01)
*G06F 17/21* (2006.01)
*G06F 17/22* (2006.01)

(52) U.S. Cl.
CPC ............ *G06Q 40/12* (2013.12); *G06Q 40/10* (2013.01); *G06F 17/211* (2013.01); *G06F 17/2294* (2013.01)

(58) Field of Classification Search
CPC .............................. G06Q 40/12; G06Q 40/10
USPC ........................................................ 705/30
See application file for complete search history.

(56) References Cited

U.S. PATENT DOCUMENTS

| | | | |
|---|---|---|---|
| 7,974,873 B2 | 7/2011 | Simmons et al. | |
| 8,180,667 B1* | 5/2012 | Baluja ................ | G06Q 30/0217 705/14.19 |
| 9,442,881 B1 | 9/2016 | Narayan et al. | |
| 9,723,057 B2 | 8/2017 | Wiener et al. | |
| 9,792,653 B2* | 10/2017 | Gancarz ................ | G06Q 40/02 |
| 9,805,392 B2 | 10/2017 | Connelly et al. | |
| 9,917,923 B2 | 3/2018 | Javed et al. | |
| 9,990,639 B1* | 6/2018 | Kong ................... | G06Q 30/0185 |
| 2007/0106582 A1* | 5/2007 | Baker .................. | G06Q 10/067 705/35 |
| 2013/0085902 A1* | 4/2013 | Chew ................... | G06Q 40/00 705/30 |

(Continued)

*Primary Examiner* — Florian M Zeender
*Assistant Examiner* — Christopher R Buchanan
(74) *Attorney, Agent, or Firm* — Vista IP Law Group, Llp

(57) ABSTRACT

Systems for determining a merchant name as used in mobile expense reporting applications. Embodiments commence upon receiving an image of an expense item receipt from a mobile user device. In addition to the image, embodiments receive metadata derived from a travel app running on the user device, which metadata is sent together with an association to the image. Further processing extracts a set of characteristics of text-containing regions of the expense item receipt, and then forms a feature vector comprising the extracted characteristics of the text-containing regions as well as aspects of the metadata received from the user device. The feature vector is input into a predictor to determine at least one predicted merchant name. The metadata can comprise information selected from a mobile app that is operational on the user terminal. Such information can comprise user travel profile information and/or user itinerary information and/or user mileage tracker app information.

20 Claims, 19 Drawing Sheets

(56) References Cited

U.S. PATENT DOCUMENTS

| | | | | |
|---|---|---|---|---|
| 2013/0129218 A1* | 5/2013 | Barrett | ............... | G06Q 20/401 |
| | | | | 382/182 |
| 2014/0105510 A1* | 4/2014 | Chelst | ............... | G06Q 40/125 |
| | | | | 382/218 |
| 2017/0026331 A1* | 1/2017 | Vijay | .................... | H04L 51/32 |

* cited by examiner

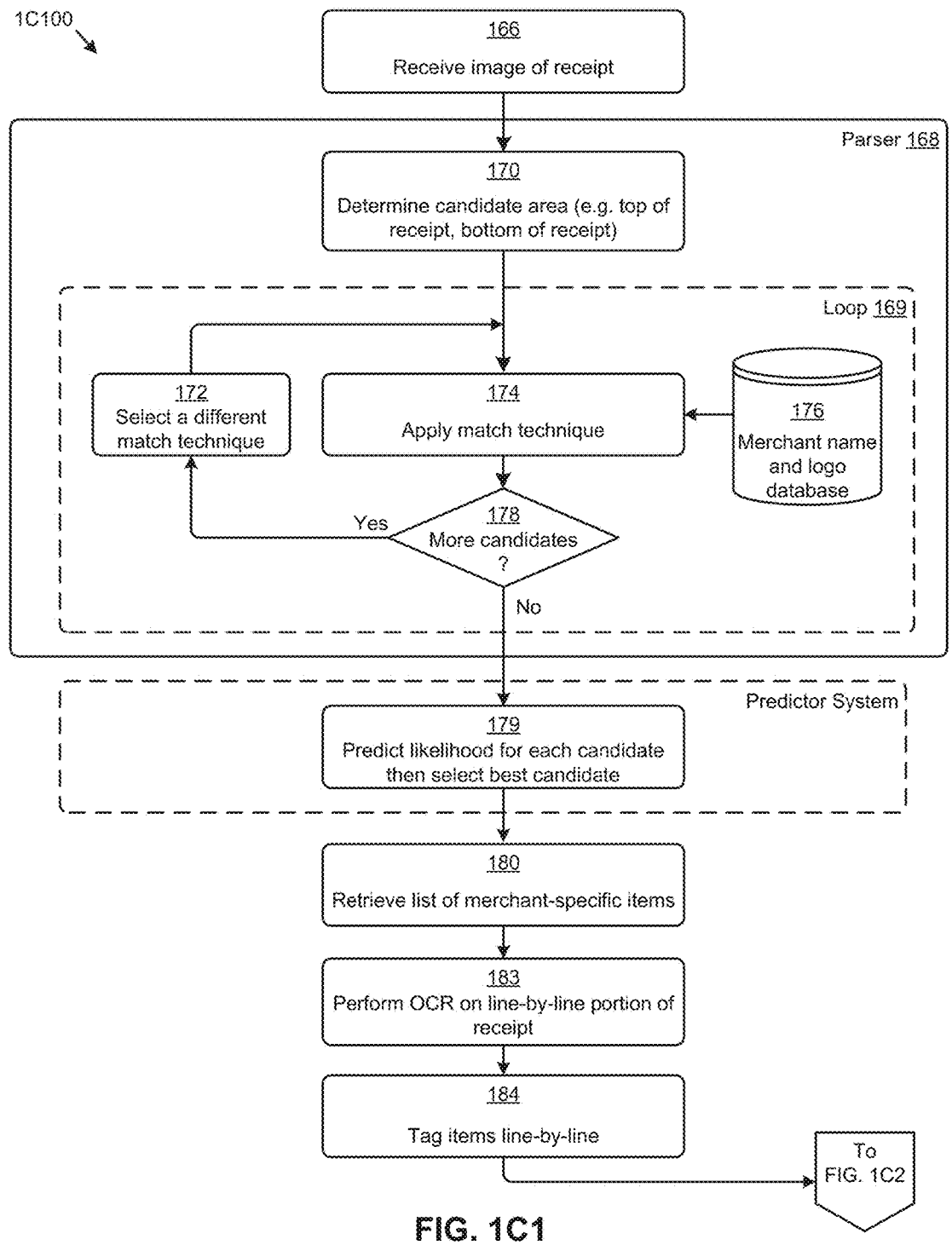
FIG. 1C1

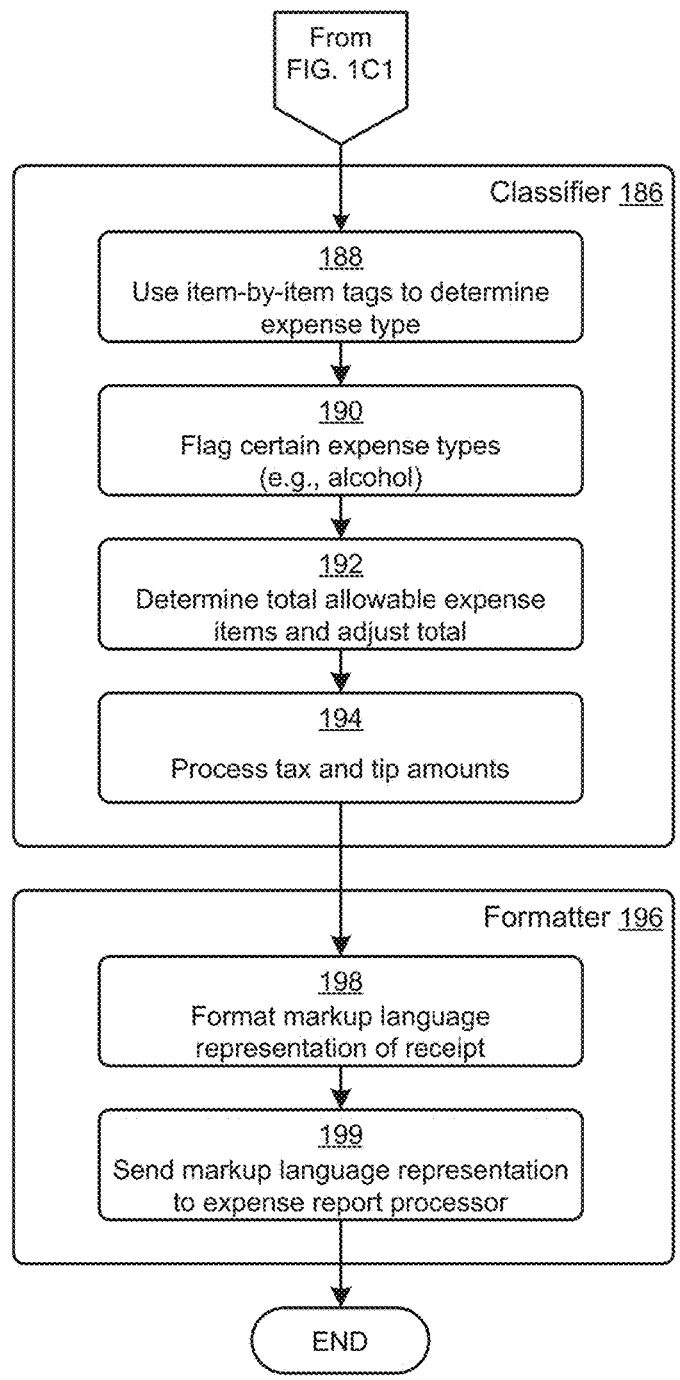
FIG. 1C2

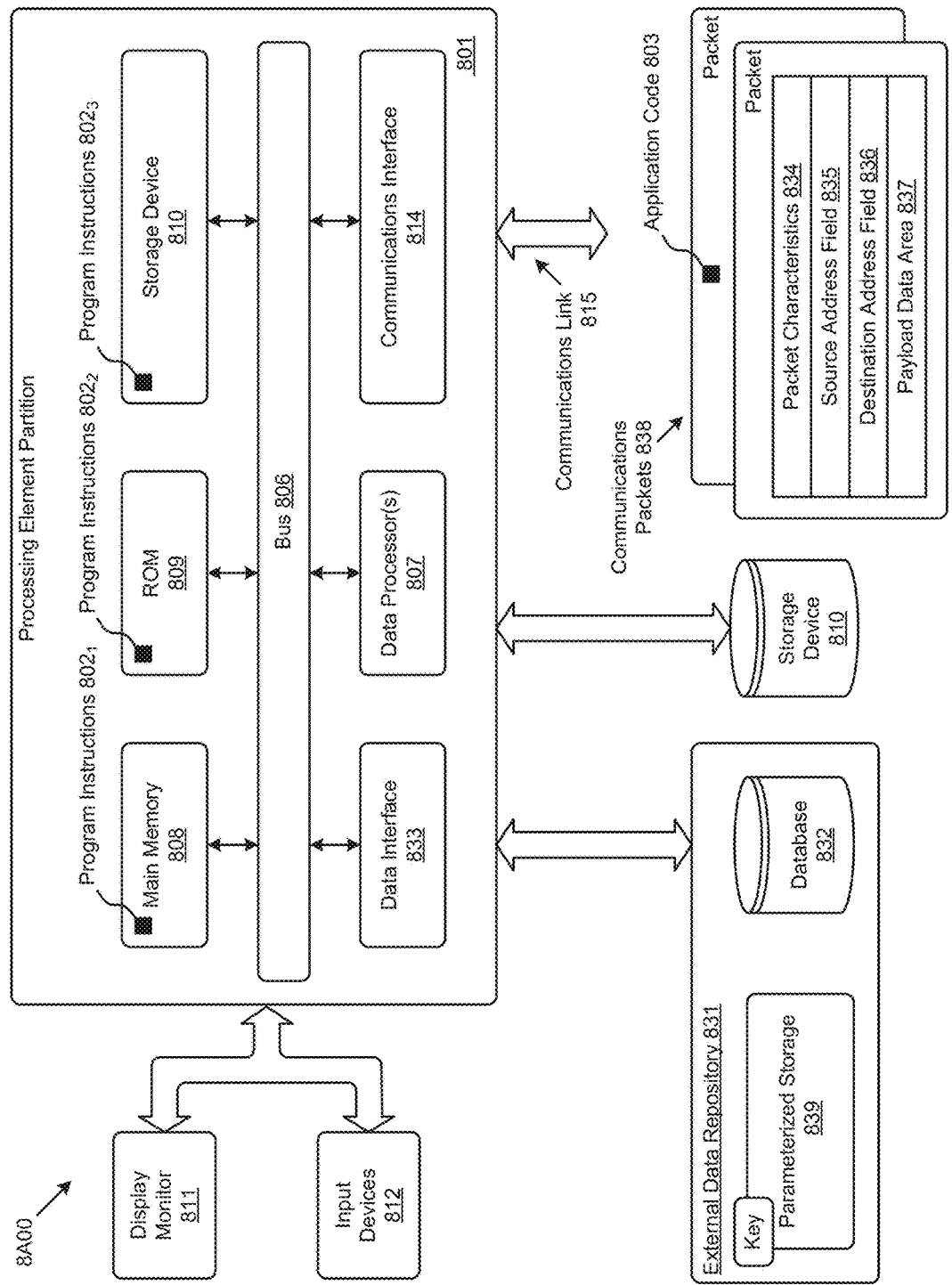

MERCHANT IDENTIFICATION AND EXPENSE ITEM CLASSIFICATION FROM A MOBILE DEVICE CAPTURE OF AN EVENT RECEIPT

FIELD

This disclosure relates to mobile expense reporting applications, and more particularly to techniques for high-accuracy markup language tagging of expense items based on merchant identification.

BACKGROUND

The task of completing expense reports has been the bane of business travelers. While some transactions can be handled completely by computers (e.g., using a computerized transaction report such as a computer-readable credit card statement), there remain many situations where only a paper copy is available. The busy business traveler nonetheless must submit an expense report with such transactions. Legacy techniques to aid the business traveler have included the use of optical character recognition (OCR) to decipher expense items found on a receipt (e.g., using a computer-captured image of the receipt), however legacy OCR techniques often fail when attempting to recognize the merchant name and also fail to recognize expense items found on a receipt. Often a merchant will stylize their name, sometimes even omitting any character-level occurrences of the merchant's name in favor of providing branding images and/or merchant identification in the form of the merchant's logo. Some legacy approaches have attempted to correlate information found on the receipt in order to discern the merchant name, however such legacy techniques fail to find such correlations within an acceptable error rate. What is needed is a technique or techniques to identify the merchant so as to produce a computer-readable document that describes the transaction including the merchant name.

BRIEF DESCRIPTION OF THE DRAWINGS

The drawings described below are for illustration purposes only. The drawings are not intended to limit the scope of the present disclosure.

FIG. 1C1 is a flowchart of a parser implementation used to achieve high-accuracy markup language classification of expense items based on merchant identification, according to an embodiment.

FIG. 1C2 is a flowchart of a classifier-formatter implementation as used to achieve high-accuracy markup language classification of expense items based on merchant identification, according to an embodiment.

FIG. 8A, FIG. 8B, and FIG. 8C depict exemplary architectures of components suitable for implementing embodiments of the present disclosure and/or for use in the herein-described environments.

DETAILED DESCRIPTION

Figure 1A:
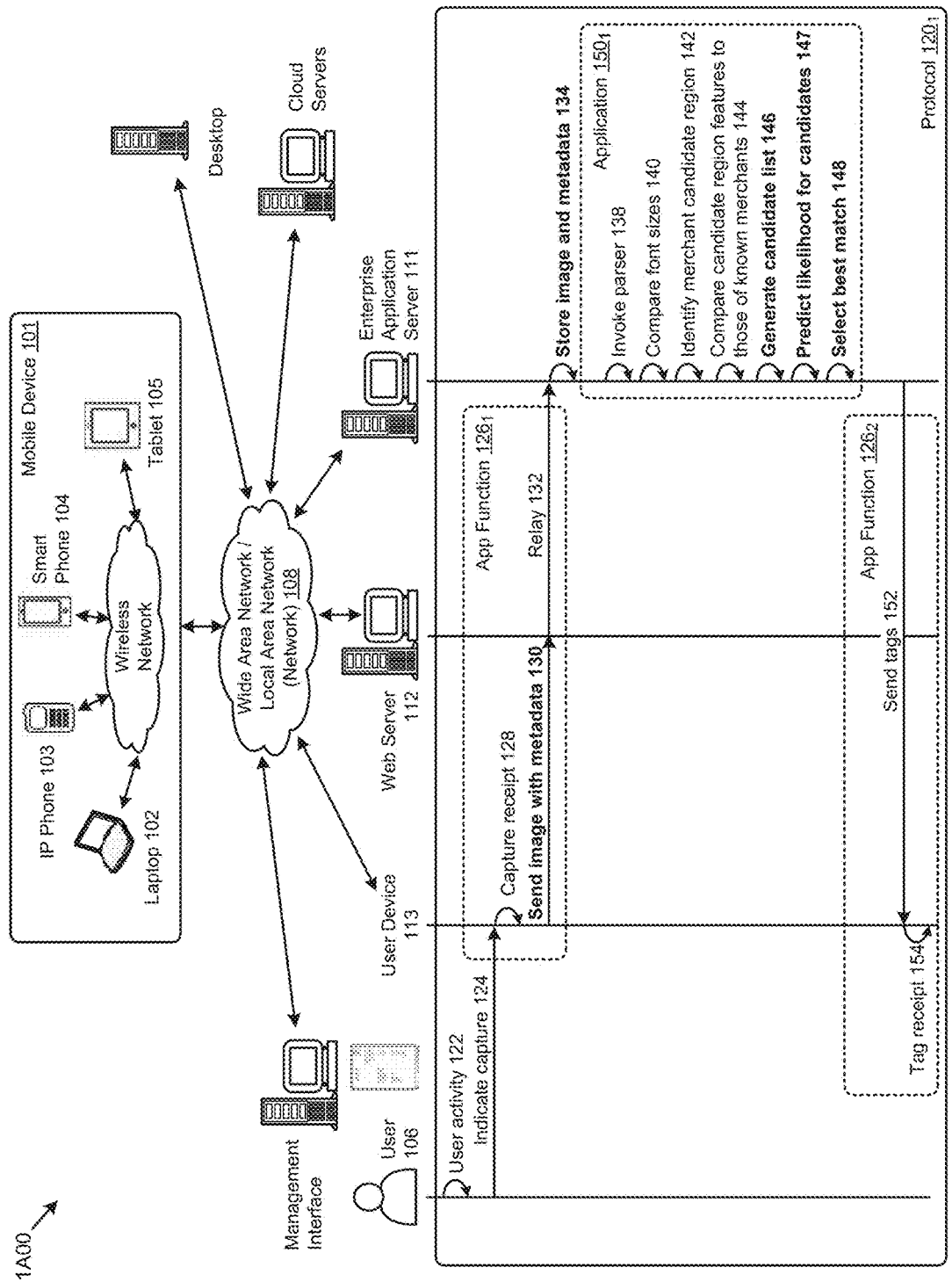
FIG. 1A depicts an environment and protocol for achieving high-accuracy markup language tagging of expense items based on merchant identification.

Some embodiments of the present disclosure address the problem of determining a merchant identity from an image of a paper receipt and some embodiments are directed to approaches for isolating candidate merchant identification areas before iterating over computer-aided recognition techniques. More particularly, disclosed herein and in the accompanying figures are exemplary environments, systems, methods, and computer program products for high-accuracy markup language tagging of expense items based on merchant identification.

Overview

Often a merchant will stylize their name, sometimes even omitting any character-level occurrences of the merchant's name in favor of providing a modicum of merchant identification in the form of the merchant's logo. The techniques described herein serve to unambiguously identify a merchant name from a paper receipt.

Various embodiments are described herein with reference to the figures. It should be noted that the figures are not necessarily drawn to scale and that the elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A depicts an environment 1A00 and protocol for achieving high-accuracy markup language tagging of expense items based on merchant identification. As an option, one or more variations of environment 1A00 or any aspect thereof may be implemented in the context of the architecture and functionality of the embodiments described herein.

As shown, a user 106 is engaged in a user activity 122 that is associated with an expense item, and for which user activity a receipt is produced (e.g., a paper receipt from a register tape). The user interacts (e.g., see action 124) with a user device 113 (e.g., a smart phone 104) and captures a photo image of the receipt (e.g., see operation 128). In addition to capturing a photo image of the receipt (e.g., in a jpeg or tiff or bmp, or dcs format), the image is sent with a corpus of metadata. Such metadata may be embedded in the photo image of the receipt (e.g., in accordance with the particular format), or such metadata can be appended (or sent separately) in an association with the photo image of the receipt. Such metadata can be used in conjunction with other data (e.g., image data, external data, database data, etc.) in order to determine the merchant name and to determine the line item content with a high degree of accuracy.

Strictly as examples, the metadata that is appended to or sent separately in association with the photo image of the receipt can include:

Date and time information (e.g., in any format);
User identification information (e.g., login information, credential information);
Global positioning (e.g., GPS) information;
User travel profile or user information from a travel itinerary;
User mileage tracker information (e.g., recent history of trips or segments); and
Other information.

In particular, metadata that is appended to or sent separately in association with the photo image of the receipt can include any metadata or other information derived from travel apps that are installed on the user device.

In this embodiment, the user follows a protocol $120_1$ to upload the captured image with a corpus of metadata (see message 130) to a component in the network (e.g., a network component or a middleware component (e.g., web server 112) using one or another forms of network messaging. The network component relays the photo image with its corpus of metadata to an enterprise application server 111 (see message 132). Various portions of the aforementioned protocol can be performed or facilitated by hardware and software available on or by the user device (e.g., see app function $126_1$), and/or can be performed or facilitated by hardware and software available on the network.

The enterprise application server 111 can host all or portions of an expense tracking application. As such, the enterprise application server 111 can store the captured image with it corpus of metadata (see operation 134) and then invoke a parser (see operation 138) that parses the corpus of metadata and the image in order to identify regions within the sight of the image so as to identify characteristics of the captured image such as uses of one or more fonts or typefaces (see operation 140). Multiple lines of text and/or multiple lines that were printed in one or more of the identified fonts or typefaces can be used to identify regions (e.g., rectangular regions, circular regions, oblong regions, horizontal text regions, vertical text regions, etc.) within the sight of the image. Different fonts or typefaces and/or the transitions between different regions within the sight of the image are used to identify particular regions that might contain the merchant name. Multiple regions might be designated as merchant region candidates (see operation 142). Features of the merchant region candidates (e.g., aspect ratio, letters found from OCR, etc.) might be extracted compared to entries in a database of known merchants (see operation 144) so as to identify a set of merchant names that in some way correlate to the extracted features of the merchant region. Any or all (or none) of the identified candidate merchant names can be scored (see operation 146) to produce a list of candidates that have a match score above a threshold. Each merchant name from the list of candidates can be used as an input to a predictor (see operation 147). Such a predictor can be derived from a learning model that receives many inputs (e.g., features, environmental conditions, etc.). Any one or more combinations or variations of a selecting algorithm can be used to resolve to a best candidate merchant name, which is then stored for later retrieval (see operation 148). Any, or all, or more operations of the foregoing can be performed within an application $150_1$ running on the enterprise application server 111. Determination and sending of tags comprising a markup-language codification of the merchant name (see message 152) can be performed by middleware and/or by the user device, and/or the determination and sending of tags can be performed cooperatively between the user device and/or any middleware components, and/or any back-end servers. As shown, the user device can present a tagged receipt (see message 154) to the user (e.g., see app function 126$_2$).

Additional processing can be performed by the enterprise application server 111, and such additional processing can be performed in parallel with, or in series with, the aforementioned processing of the captured receipt. In some cases, the enterprise application server 111 processes line items determined from the image of the printed receipt. For example, the enterprise application server 111 can processes expense types and line item-level classification of expense items.

Figure 1B:
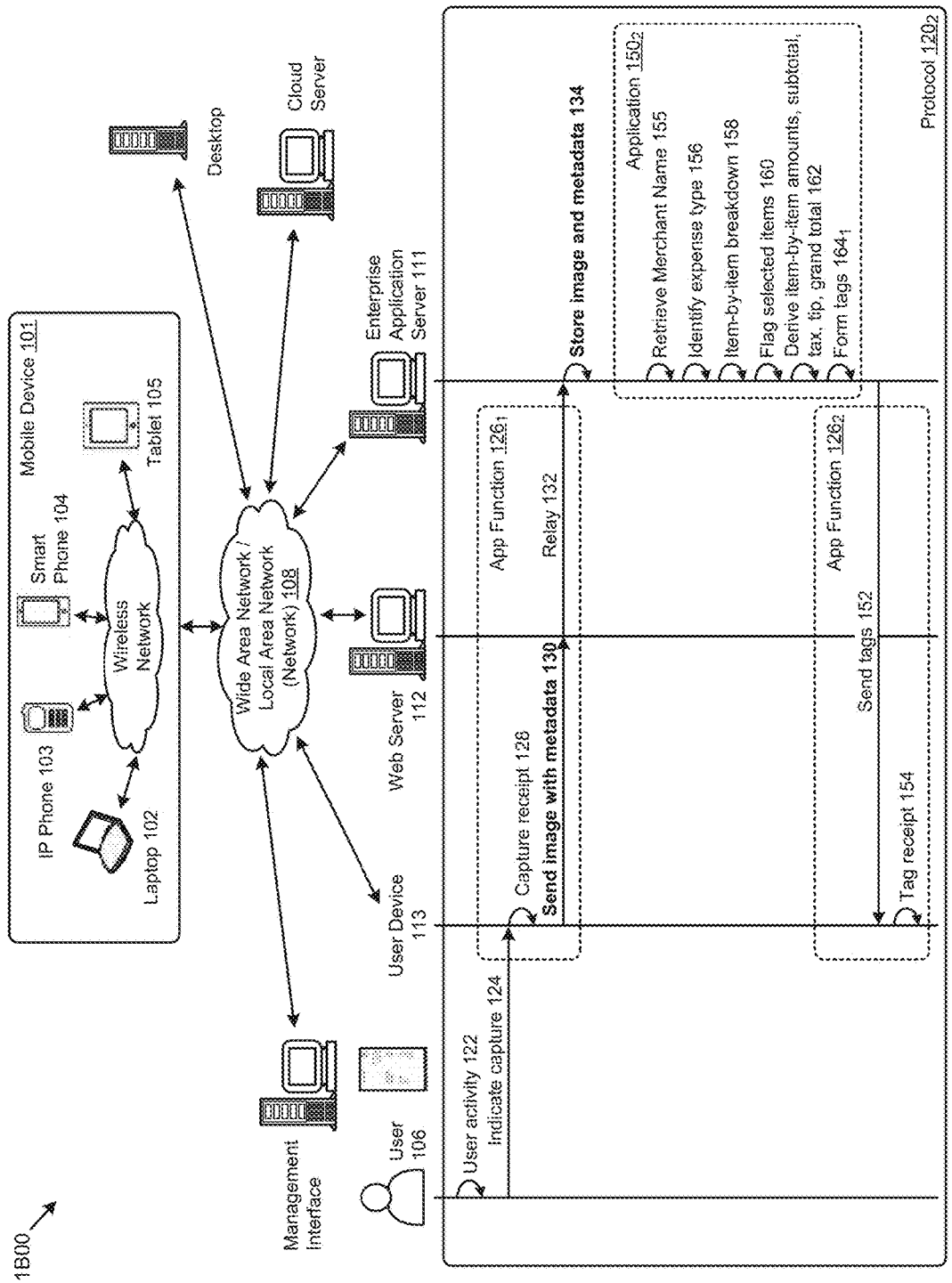
FIG. 1B depicts an environment and protocol for achieving high-accuracy markup language classification of expense items based on merchant identification.

FIG. 1B depicts an environment 1B00 and protocol for achieving high-accuracy markup language classification of expense items based on merchant identification. As an option, one or more variations of environment 1B00 or any aspect thereof may be implemented in the context of the architecture and functionality of the embodiments described herein.

As shown, the protocol 120$_2$ includes a series of operations embodied in application 150$_2$. Specifically, after retrieving the merchant name (see operation 155), the parser can perform an item-by-item breakdown (see operation 158), which breakdown can be used to identify expense types (see operation 156), possibly also on a line-by-line or item-by-item level. In some cases, the application 150$_2$ serves to flag selected items (see operation 160), which flagged selected items can be further dispositioned (e.g., as an allowed expense or a disallowed expense). Certain line-by-line expense items can be classified as comprising a "tax amount" and/or a "tip amount" and/or a "subtotal amount" and/or a "grand total amount" (see operation 162).

The protocol continues upon determination and/or classification of tags and/or formation of tags (e.g., see operation 164$_1$) and sending of tags (see message 152), which tags comprise a markup-language codification of line-by-line expense items. A classifier can be implemented as a flow of steps in a parser. One embodiment of a parser is shown and described as pertaining to FIG. 1C1.

FIG. 1C1 is a flowchart 1C100 of a parser implementation used to achieve high-accuracy markup language classification of expense items based on merchant identification. As an option, one or more variations of flowchart 1C100 or any aspect thereof may be implemented in the context of the architecture and functionality of the embodiments described herein. Also, the flowchart 1C100 or any aspect thereof may be implemented in any environment.

The flowchart 1C100 commences upon receiving an image of a receipt (see step 166), which image is provided to a parser 168 that serves to identify a merchant name, and further to tag items on a line-by-line basis. Steps taken after invocation of the parser can include classification and formatting (e.g., as shown in FIG. 1C2).

As shown, the parser 168 determines regions (e.g., area boundaries or perimeters) that are present on the image of the receipt (see step 170). One or more of such regions are considered as candidate areas from which to determine the merchant name. The merchant name might be presented in a stylized typeface and/or might be presented within, or adjacent to, a logo. A loop is entered, within which loop one or more techniques to identify a merchant name match (e.g., as compared with entries in a merchant name and logo database 176) is performed. A first match technique is applied (see step 174) and a determination is made as to the quality or confidence of the match (see decision 178). If the quality or confidence of the match (e.g., a match score) is sufficient (e.g., exceeds a threshold), then the merchant name is deemed to be extracted and processing proceeds to retrieve a list of items that are associated with the extracted merchant (see step 180). If the quality or confidence of the match (e.g., a match score) is not sufficient (e.g., fails to meet a threshold), then the merchant name is deemed to be ambiguous, and processing proceeds to select a different match technique (see step 172). Strictly as one example, when a quality metric or confidence metric of the match that is determined based on optical character recognition (OCR) is deemed to be of low score or is deemed to be ambiguous, then another matching technique based on image comparison of a scanned logo (e.g., within a candidate region) is compared with the merchant name and logo database 176.

When loop 169 is exited, there may be multiple candidate merchant names. The candidate merchant names are used in combination with a feature vector and a predictor to predict likelihood for each of the candidate merchant names (see step 179). When at least one merchant name has been predicted, then and a list of merchant-specific items is retrieved (see step 180). Processing continues and, in some cases, the retrieved merchant-specific items are used to improve the accuracy of a line-by-line OCR of the receipt (see step 183). Any of the line-by-line expense items can be tagged (see step 184). Processing for classification and formatting commences, for example, in accordance with the flow of FIG. 1C2.

FIG. 1C2 is a flowchart 1C200 of a classifier-formatter implementation as used to achieve high-accuracy markup language classification of expense items based on merchant identification. As an option, one or more variations of flowchart 1 C200 or any aspect thereof may be implemented in the context of the architecture and functionality of the embodiments described herein. Also, the flowchart 1 C200 or any aspect thereof may be implemented in any environment.

The flowchart 1C200 includes a classifier 186 and a formatter 196. Steps within the classifier include use of the item-by-item tags (e.g., as determined in step 184) in order to determine an expense type (see step 188) for a line item. Cost controls can be enforced here so as to flag excessive charging (e.g., by the merchant) or spending (e.g., by the user). For example, a line-item charge of $9.99 for a "Chocolate bar" might be flagged as excessive, and reimbursement might be disallowed.

Other steps are included to flag certain sensitive expense items (e.g., alcohol), and some or all of such flagged items (see step 190) can be disallowed, or the allowed reimbursement amount can be reduced in accordance with spending limits or rules that are in force. Determination of disallowances and/or reduced allowed amounts and/or permitted and allowed expenditures can be totalized (see step 192) and corresponding allowable tax and tip amounts can be calculated (see step 194).

Results from the classifier can be used by a formatter 196, which serves to format a markup language representation of the receipt (see step 198). Further steps can be initiated by sending the markup language representation of the receipt to an expense report processor (see step 199).

Figure 1D:
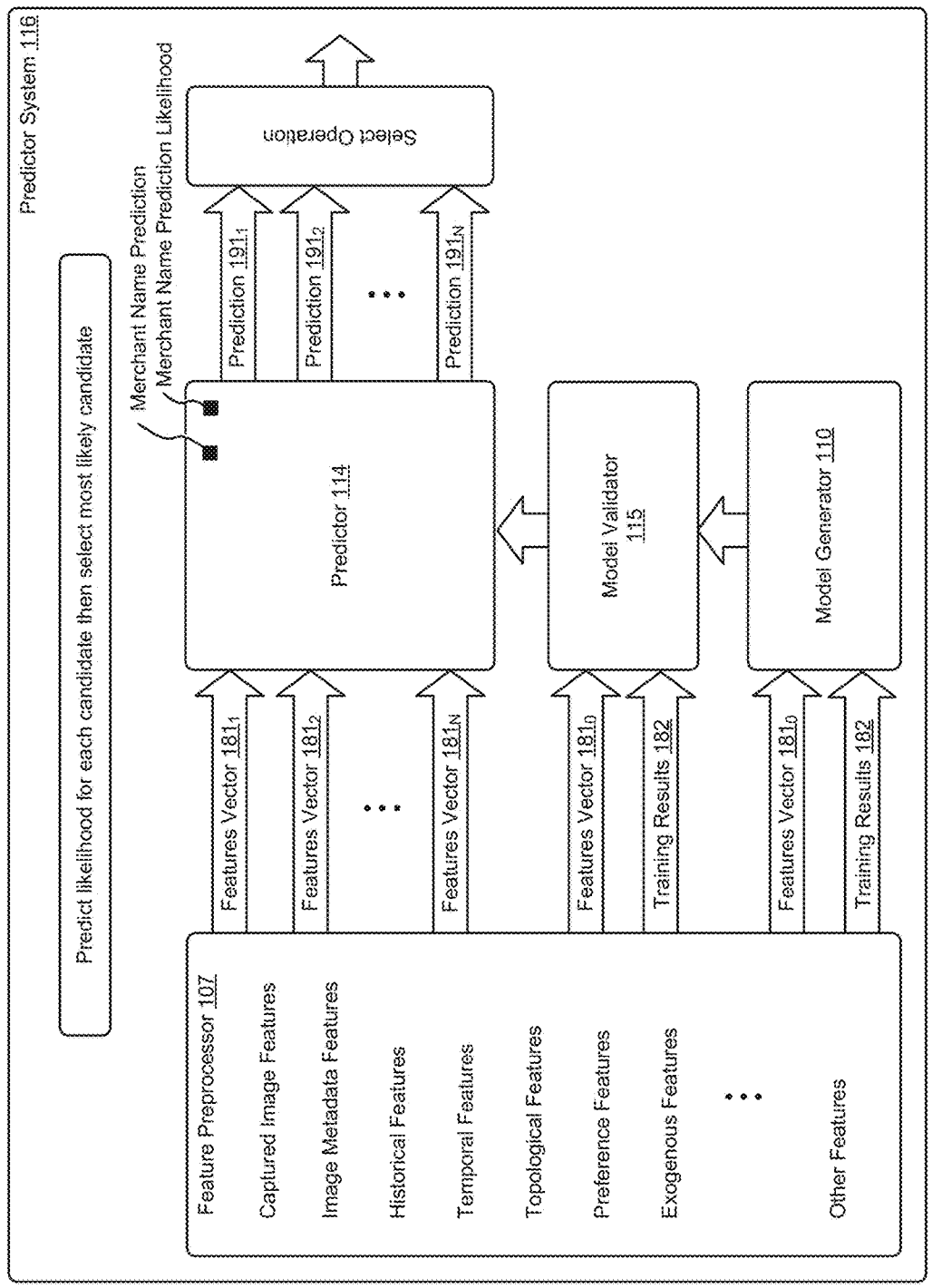
FIG. 1D depicts a support vector machine implementation of a predictor system used for achieving high-accuracy markup language classification of expense items based on merchant identification, according to an embodiment.

FIG. 1D depicts a support vector machine implementation of a predictor system 116 used for achieving high-accuracy markup language classification of expense items based on merchant identification.

Referring again to FIG. 1C1, iterations through the loop 169 can produce multiple match candidates using multiple matching techniques. In the presence of multiple match candidates a predictor can be used to calculate relative or absolute likelihoods that pertain to each of the multiple match candidates. A predictor can be developed using machine learning techniques. In the embodiment shown, the predictor 114 is generated and validated using a model generator 110 and a model validator 115, respectively. The model generator accepts as input a sequence of vectors, each vector comprising a set of features pertaining to the captured image (e.g., receipt). The features may pertain to aspects other than merely the receipt itself. Strictly as example, in addition to features of the captured image, the features may pertain to historical items, temporal features, topological features, preference features, exogenous features, and other features as well. A detailed listing of some of such features that correspond to the aforementioned feature categories is given below.

The features can be codified into vectors that can be processed by a computer, and are indeed processed by the feature preprocessor 107, which in turn delivers vectors to a model generator 110, a model validator 115, and a predictor 114. The model generator correlates input vectors (e.g., features vector $181_0$) with known correct results (e.g., training results 182) to form a trained predictive model. The model validator uses a portion of a corpus of input vectors and a portion of the known correct results to validate the predictive model to a predetermined level of precision and recall. The model can then be used as a predictor 114 such that, given an input features vector, a predicted output is generated.

Strictly as an example, a set of vectors might comprise features taken from the receipts of twenty trips to "Dunking Doughnuts" and the receipts of twenty trips to "Don's Doughnuts". For training the model, the results (e.g., expected output of the predictor) are input to the model generator. A set of vectors derived from receipts of twenty other trips to "Dunking Doughnuts" and the receipts of twenty other trips to "Don's Doughnuts" are input to the vector corpus and the precision and recall (and other quantifications) are calculated. The validated model can be used as a predictor, and results from predictor 114 can be deemed to be statistically reliable, at least to the extent as determined by the model validator 115.

As earlier indicated, iterations through the loop 169 can produce multiple match candidates (e.g., multiple merchant names). The merchant names as well as other features are passed through the predictor (e.g., features vector $181_1$, features vector $181_2$, features vector $181_N$) and, for each such vector, the predictor produces a prediction. Strictly as an example, if a group of receipts from "Dunking Doughnuts" had the feature from an OCR scan of the string "Piping Hot Coffee", and a group of receipts from "Don's Doughnuts" had the feature from an OCR scan of the string "Coffee", the predictor would use this correlation in determining a likelihood that a particular receipt pertains to a "Dunking Doughnuts". The foregoing feature example is merely one example. Other features can be included in the features vector, some of which such features are listed below.

Captured Image Features
   Relative font sizes on the receipt
   Aspect ratio of regions within the receipt (e.g., merchant name region features)
   Number and juxtaposition of whitespace gutters
   Presence or lack of a logo
   Proximity of a logo to other extracted characteristics
   Corpus of line items on the receipt
   Corpus of identified expense types for the line items
   Combination of expense types found among the line items Historical Features
   Merchants in the user's trip itineraries and previous trip details existing in the system
   Merchants from the user's loyalty programs and preferred member information stored in the system
   Merchants used by the user on their mobile devices through a payment application (e.g., ApplePay™, Square™, etc.)
   Merchants previously used by the user on corporate card transactions
   Popular merchant names and chain stores stored in the system
   List of merchants compiled from corporate card transactions or cash expenses Temporal Features
   List of merchants in the trip itinerary
   List of merchants from the trip itinerary of other user/colleagues for same period of travel
   Expense types charged by the users who were on the same business trips already submitted into the system for the same or similar merchant Topological Features
   Portions or entirety of the address derived from the receipt
   List of merchants derived from a map application used to identify merchants in a predefined proximity of the address derived from the receipt
   List of merchants derived from on the route taken (e.g., based on the GPS tracker, based on a mobile mileage tracker app, or based on a travel app running on the user device, etc.)
   Merchant reference list taken from a preferred vendor list pertaining to the vicinity of the address derived from the receipt Preference Features
   Preferred merchants identified in the user's profile
   Merchants frequently used by the user
   Merchant list derived from corrections made by the user pertaining to previously scanned information Exogenous Features
   Names of merchants listed in the user's address books
   Names of merchants references in databases of specific apps used by the user
   Names of merchant references in social media apps used by the user Given multiple merchant name prediction outputs (e.g., prediction $191_1$, prediction $191_2$, and prediction $191_N$) resulting from the multiple feature vector inputs, the merchant names and their respective likelihood of accuracy indications can be used for downstream processing. The following figure presents an approach to determining a merchant name from a captured image and other readily available information.

Capture and Use of Additional Features

Figure 1E:
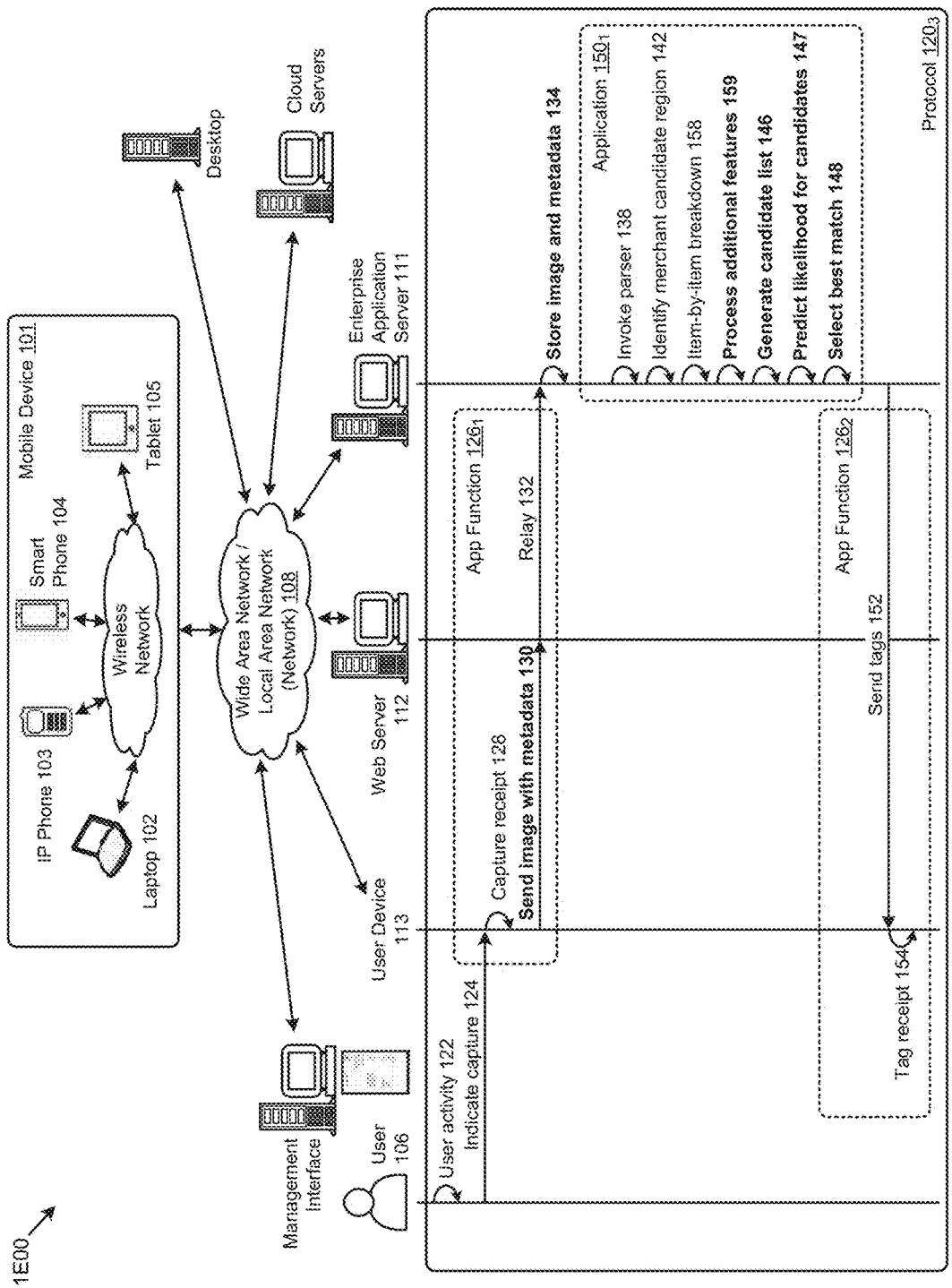
FIG. 1E depicts an environment and protocol for achieving high-accuracy markup language classification of expense items based on merchant identification, according to an embodiment.

FIG. 1E depicts an environment 1E00 and protocol $120_3$ for achieving high-accuracy markup language classification of expense items based on merchant identification. Specifically, the protocol includes steps to perform an item-by-item breakdown (see operation 158), after which additional features can be selected (see operation 159). The additional features can be used for feature vectors and/or processed for other purposes. This embodiment includes a step to generate a list of candidate merchant names from which list of candidates a best match is selected (see operation 148) after use of the predictor (see operation 147). As can be understood, the full range of information available as pertains to the transaction at a merchant can be used to determine the merchant. In some cases, the merchant can be determined with a high degree of confidence even when the merchant name and/or logo are obliterated from the receipt. More particularly, a corpus of user interactions (e.g., as captured in a user profile store) can sometimes be dispositive (e.g., strongly correlated to a particular merchant). In some cases the merchant can be predicted even in absence of a legible image capture. The following figures disclose techniques that can be used to form features that are subsequently used to rank and select a merchant.

Figure 2A:
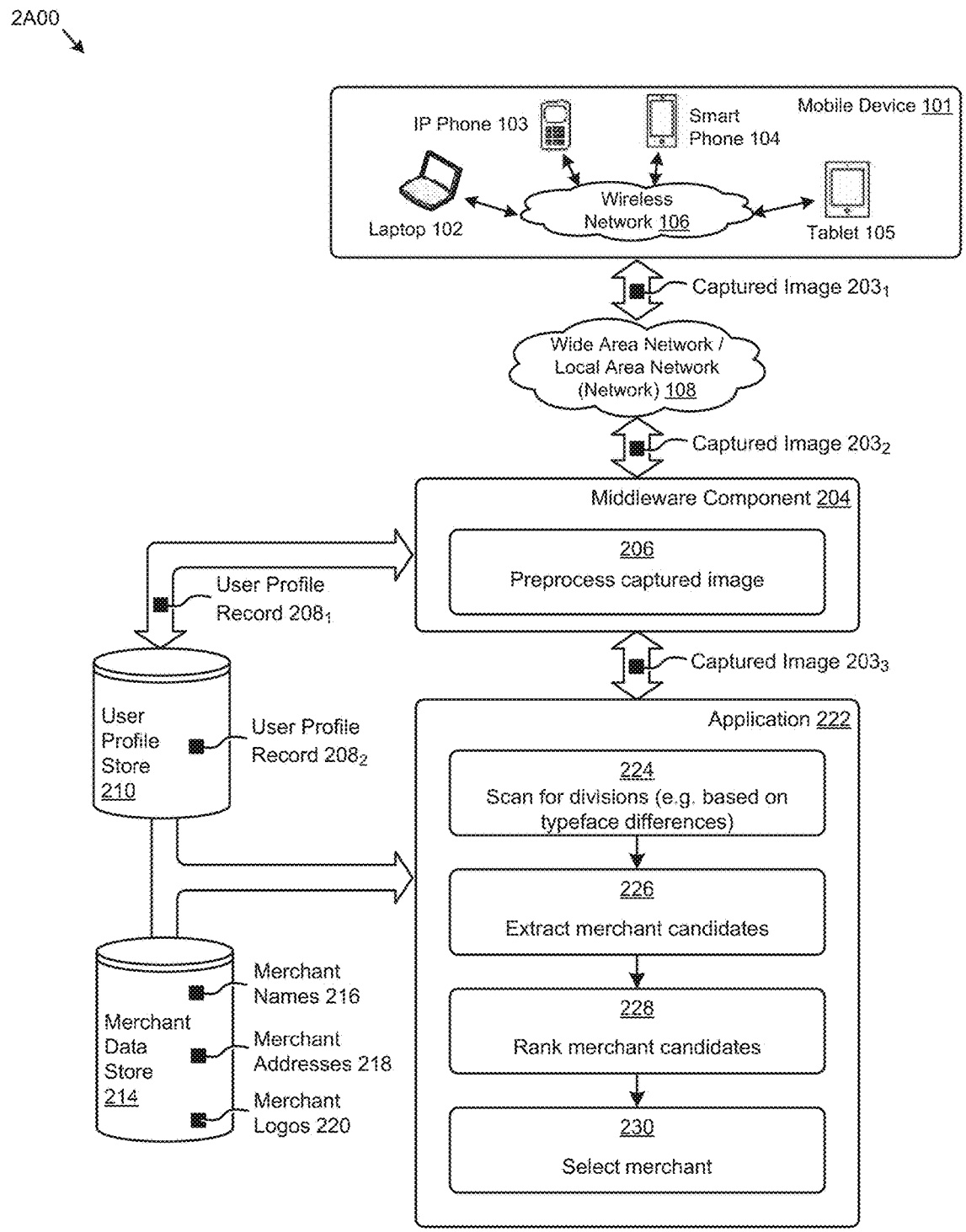
FIG. 2A depicts user interactions with an expense application that selects merchant name candidates, according to an embodiment.

FIG. 2A depicts user interactions 2A00 with an expense application that selects merchant name candidates. As an option, one or more variations of user interactions 2A00 or any aspect thereof may be implemented in the context of the architecture and functionality of the embodiments described herein. Also, the user interactions 2A00 or any aspect thereof may be implemented in any environment.

The embodiment shown in FIG. 2A exemplifies a multi-computer implementation of one technique to identify merchant name candidates from a captured image. Specifically, a user device (e.g., a smart phone 104, an IP phone 103, a laptop 102, a tablet 105, or any other similar instance of the shown mobile devices 101) can be used to take a photo of a receipt (see captured image $203_1$), which can be sent over a network (e.g., see network 108) to a middleware component 204. Such a middleware component might preprocess (see step 206) the captured image $203_2$, (e.g., to crop and ratify or to add contrast and ratify) before sending an image-processed instance of the captured image (see captured image $203_3$) and onward to an application (e.g., backend application 222). The processing performed in the middleware can access a user profile store 210 (e.g., comprising user profile records $208_1$, user profile records $208_2$, etc.) and/or the processing performed in the middleware can access a merchant data store 214 (e.g., which can be composed of merchant names 216 and/or merchant addresses 218 and/or merchant logos 220). Strictly as one example, the pre-processing performed by the middleware component might include image processing techniques such as color correction. Moreover such color correction can be performed based on parameters found in the user profile store. For example, an image might be color-corrected to account for variations in the cameras of particular users' smart phones.

Figure 2B:
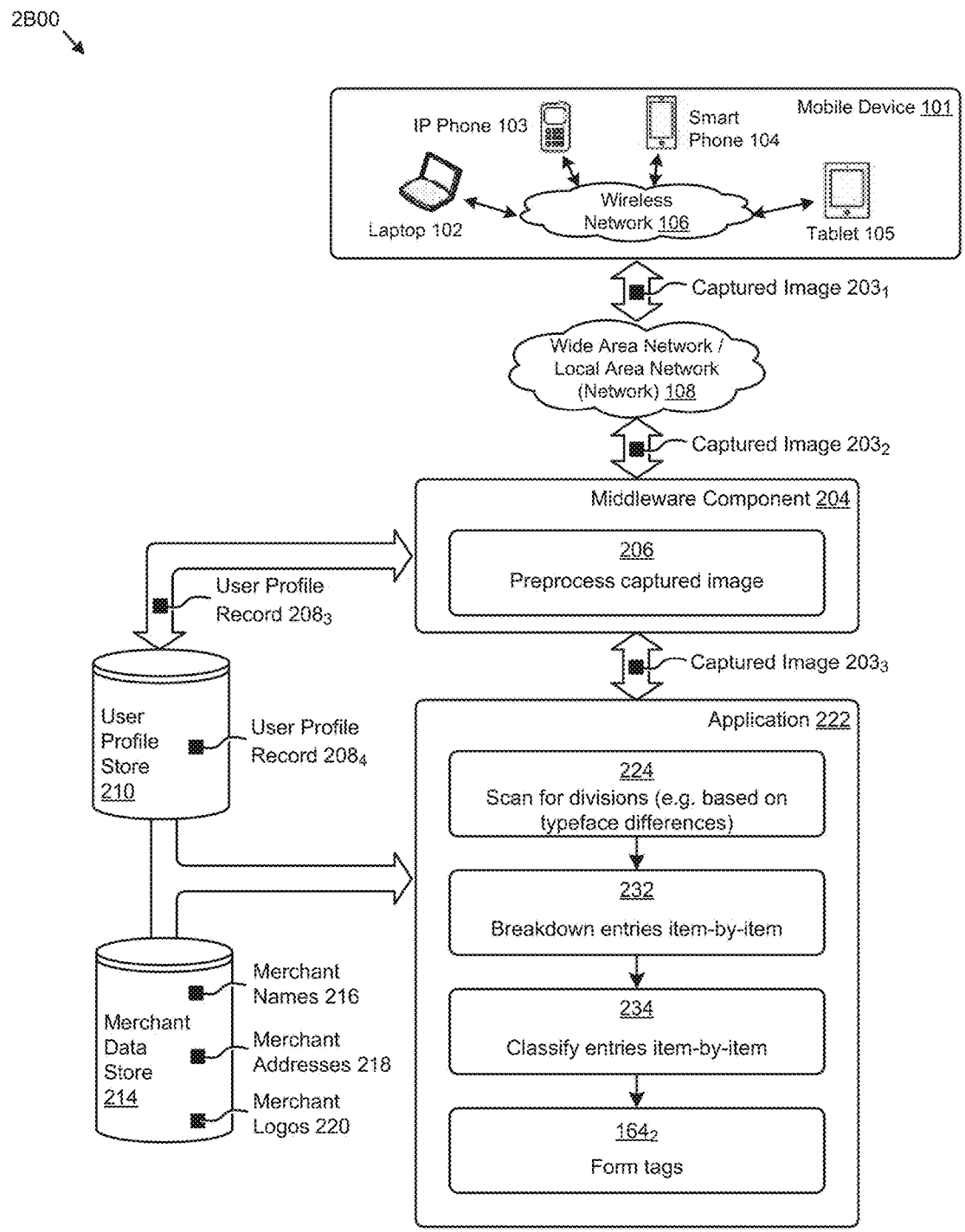
FIG. 2B depicts user interactions with an expense application that classifies receipt line entries based on high-accuracy markup language tagging of expense items based on merchant identification, according to an embodiment.

Upon receipt of the captured image $203_3$, the shown backend application 222 can scan for whitespace divisions (see step 224). The OCR'd values (e.g., text) or OCR'd images (e.g., logos) can be used in conjunction with the flow of flowchart 1C100 and/or with the flow of flowchart 1C200 to extract candidate merchant names (see step 226), rank candidate merchant names (see step 228), and select the "best match" or "best matches" (see step 230). The backend application 222, possibly including implementations of the flows of flowchart 1C100 and flowchart 1C200, can use the user profile store 210 and the merchant data store 214. Upon extraction of a high-accuracy extraction of a merchant name from a captured image (e.g., via a high-accuracy match score of the region of the captured image to a merchant name 216 or merchant logo 220) then additional information (e.g., merchant address 218) pertaining to the merchant can be provided to a classification and tagging engine. As heretofore described, additional characteristics of the captured image can be extracted. FIG. 2B depicts exemplary techniques for extracting characteristics of a captured image.

FIG. 2B depicts user interactions 2B00 with an expense application that classifies receipt line entries based on high-accuracy markup language tagging of expense items based on merchant identification. As an option, one or more variations of user interactions 2B00 or any aspect thereof may be implemented in the context of the architecture and functionality of the embodiments described herein. Also, the user interactions 2B00 or any aspect thereof may be implemented in any environment.

The embodiment shown in FIG. 2B is merely one example. As shown, the backend application 222 includes processing to scan or otherwise identify divisions (e.g., whitespace divisions) so as to identify line items (e.g., see step 224). OCR techniques can be used to extract text values for line items, which in turn can be used to form a line item-by-item breakdown of entries on the receipt (see step 232). Such identified item-by-item entries can be classified (see step 234), and tags can be applied and/or formatted (see step $164_2$).

The techniques hereinabove discussed to extract the merchant name and/or to extract the item-by-item expense breakdown can use statistical techniques in combination with OCR techniques to calculate a match score, which can be based on a distance score (e.g., closeness to character-by-character match) and/or an ambiguity score (e.g., presence or absence of other match candidates).

Figure 3A:
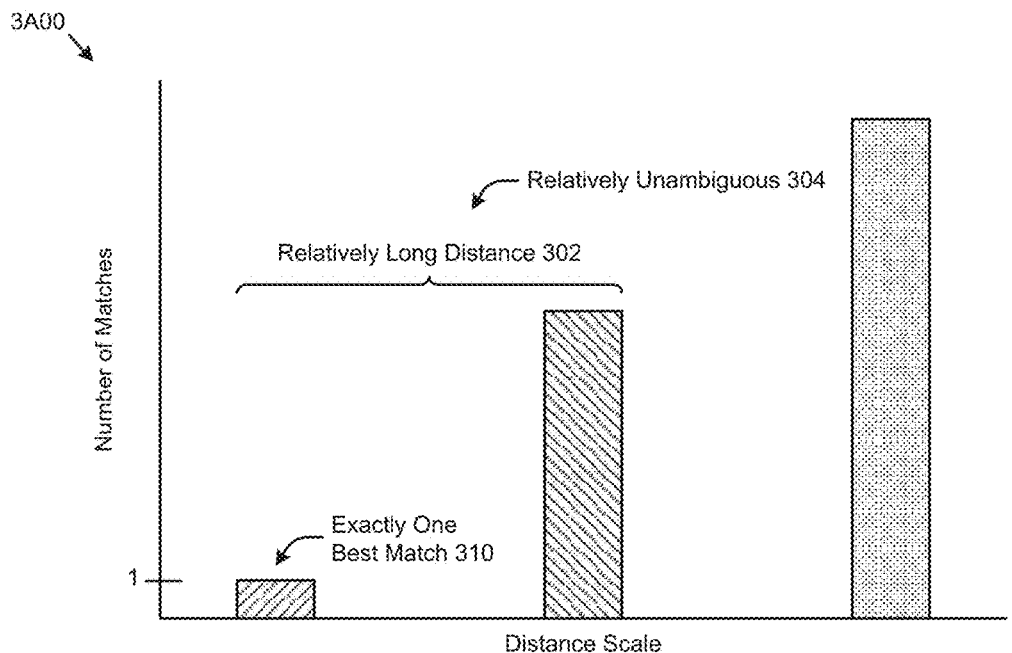
FIG. 3A is a chart depicting use of a distance measurement tool used for achieving high-accuracy markup language tagging of expense items based on merchant identification, according to an embodiment.

FIG. 3A is a chart 3A00 depicting use of a distance measurement tool used for achieving high-accuracy markup language tagging of expense items based on merchant identification. As an option, one or more variations of chart 3A00 or any aspect thereof may be implemented in the context of the architecture and functionality of the embodiments described herein. Also, the chart 3A00 or any aspect thereof may be implemented in any environment.

The chart 3A00 plots a number of candidate matches (see the ordinate) as a function of a distance scale (see the abscissa). The shown chart 3A00 depicts a situation where there is exactly one match candidate that is a "short" distance from its match. The shown chart 3A00 further depicts that a number of match candidates are present, but at a relatively long distance 302 from the best match 310. This situation is relatively unambiguous 304.

Figure 3B:
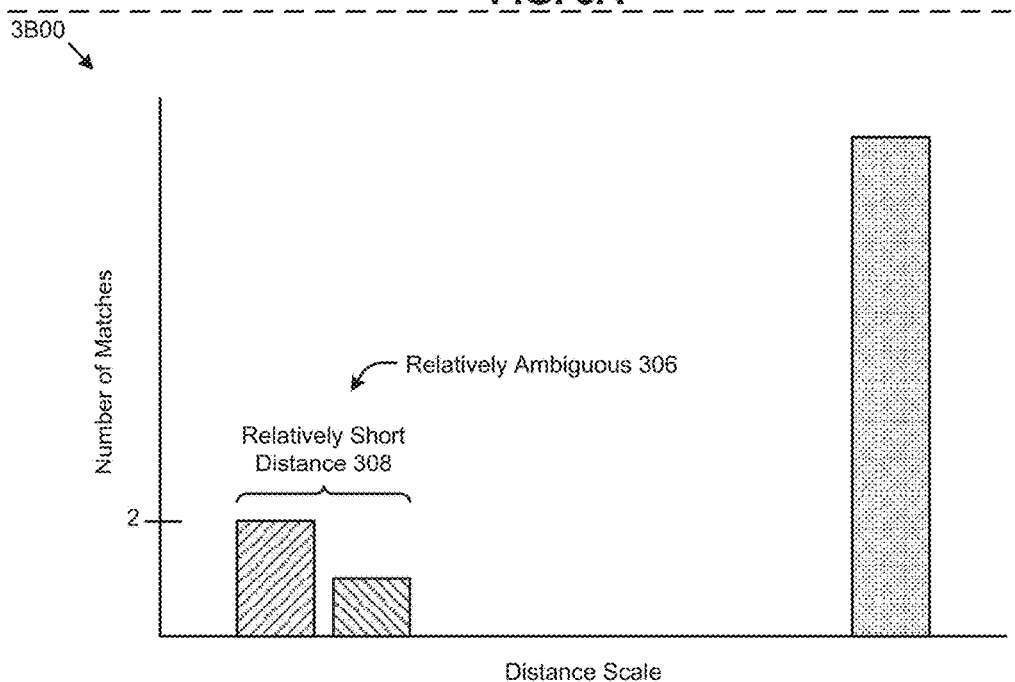
FIG. 3B is a chart depicting use of a distance measurement tool used for determining when to use alternative merchant name identification techniques, according to an embodiment.

FIG. 3B is a plot 3B00 depicting use of a distance measurement tool used for determining when to use alternative merchant name identification techniques. As an option, one or more variations of plot 3B00 or any aspect thereof may be implemented in the context of the architecture and functionality of the embodiments described herein. Also, the plot 3B00 or any aspect thereof may be implemented in any environment.

The plot 3B00 plots a number of candidate matches (see the ordinate) as a function of a distance scale (see the abscissa). The shown plot 3B00 depicts a situation where there are multiple match candidates that are each only a "short" distance from multiple match candidates 308. The shown plot 3B00 further depicts that a number of match candidates are present, but at a relatively long distance from the best match 310. This situation is relatively ambiguous 306. When a relatively ambiguous situation is detected, further processing can be invoked (see decision 178 of FIG. 1C1) so as to reduce ambiguity. In some cases, ambiguity is further reduced through user confirmations. In this and other cases where ambiguity has been sufficiently reduced, a confirmation value (e.g., a user confirmation) can be stored in a user profile store of FIG. 6B. The stored confirmation value can be used by a learning model.

Figure 4A:
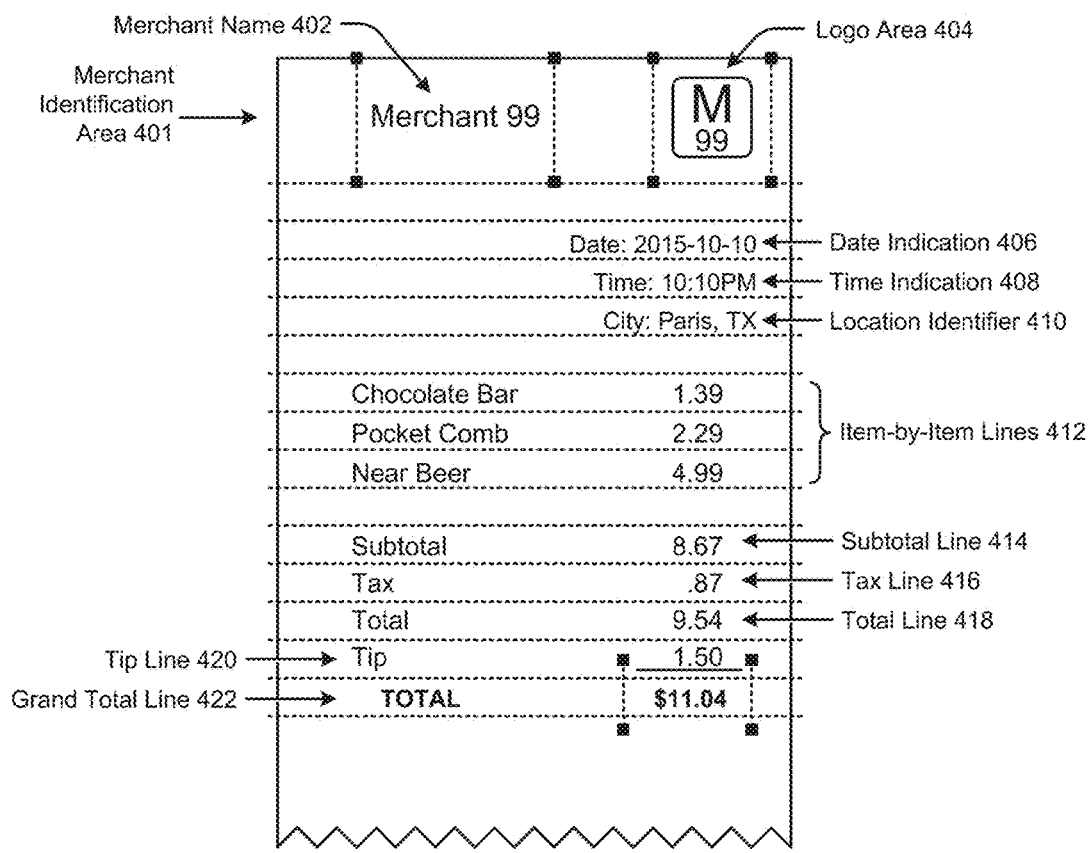
FIG. 4A and FIG. 4B depict a printed register receipt having a merchant identification area and item-by-item line amounts.
Figure 4B:
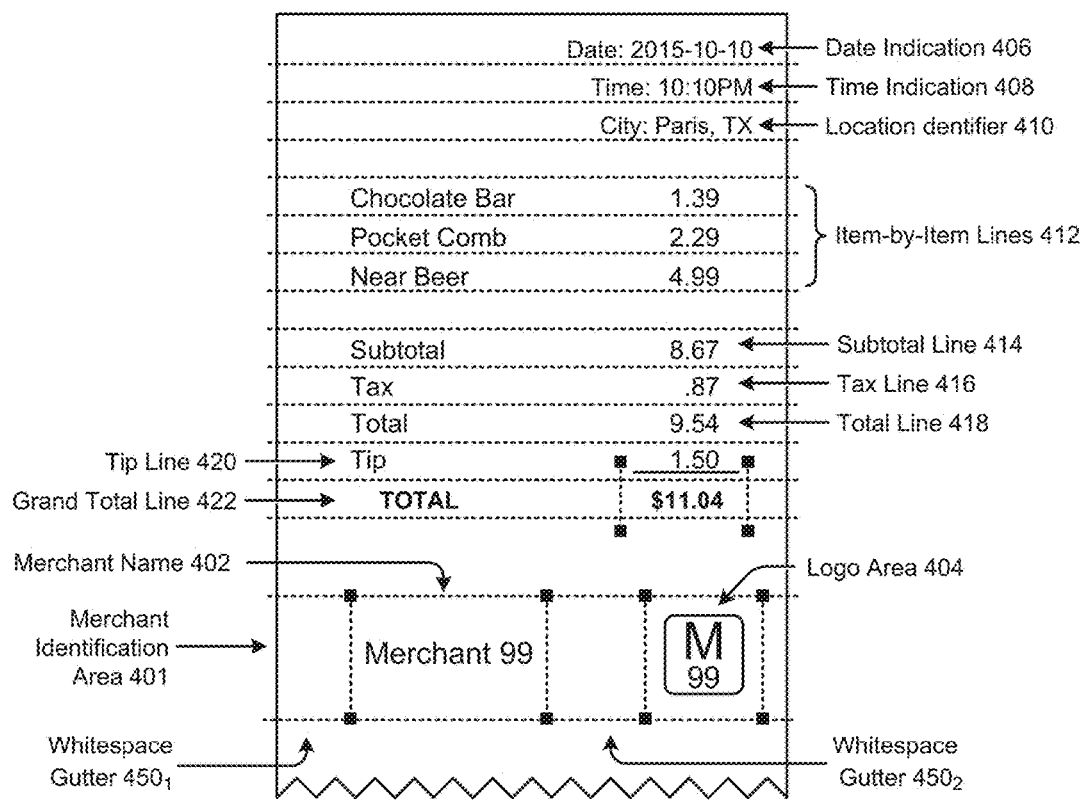

FIG. 4A and FIG. 4B depict a printed register receipt 4A00 and a printed register receipt 4B00 having a merchant identification area and item-by-item line amounts. As an option, one or more variations of printed register receipt 4A00 and printed register receipt 4B00 or any aspect thereof may be implemented in the context of the architecture and functionality of the embodiments described herein. Also, the printed register receipt 4A00 and the printed register receipt 4B00 or any aspect thereof may be implemented in any environment.

The embodiments shown in FIG. 4A and FIG. 4B are merely examples of a printed register receipt. As shown, the printed register receipt includes several areas characterized (as shown) as a stylized merchant name 402, a logo area 404, a date indication 406, a time indication 408, a location identifier 410, an area for item-by-item lines 412, a subtotal line 414, a tax line 416, a total line 418, a tip line 420, and a grand total line 422. Parameters of any of the aforementioned areas can be determined using any of the techniques discussed herein. In some cases a printed register receipt can be partitioned into areas on the basis of whitespace boundaries, rectilinear boundaries, etc. Further, the nature of a "top" and a "bottom" of a printed register receipt informs various match algorithms, which in turn can be used to form candidate regions and or candidate content (e.g., from which to extract a merchant name from a stylized merchant name or merchant logo).

The printed register receipt 4A00 and printed register receipt 4B00 include gridlines that serve to bound regions based on whitespace. The vertical and horizontal gridlines can be determined based on changes from text to whitespace, or whitespace to text, or a change from one font to another font.

FIG. 4B depicts the case where a merchant identification area (e.g., a merchant name region 401) is juxtaposed below item-by-item line amounts. The merchant identification area can be divided into multiple regions, possibly distinguished by an area for a merchant name and an area for a merchant logo. Further, one region can be separated from another region by a whitespace gutter (e.g., see whitespace gutter $450_1$ and whitespace gutter $450_2$). Aspects of a whitespace gutter (e.g., position, size, number of whitespace gutters in the merchant name region, etc.) can be used as a feature to be input into the predictor.

Figure 5:
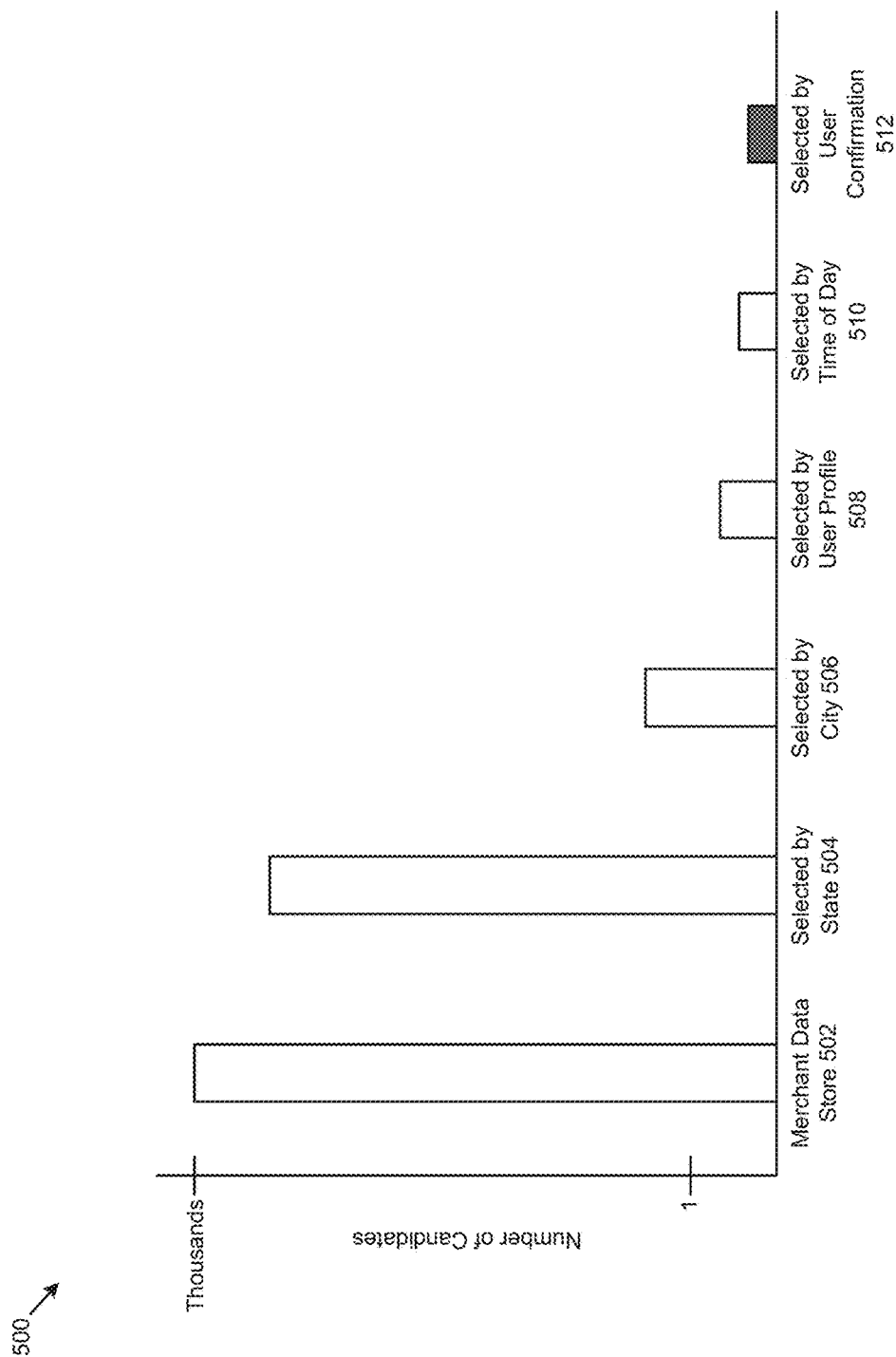
FIG. 5 presents a chart showing reduction of candidate merchant names based on reducing the field of candidates.

FIG. 5 presents a chart 500 showing reduction of candidate merchant names based on reducing the field of candidates. As an option, one or more variations of chart 500 or any aspect thereof may be implemented in the context of the architecture and functionality of the embodiments described herein. Also, the chart 500 or any aspect thereof may be implemented in any environment.

In the embodiment shown, as successive selection techniques are applied, the likelihood of reducing the number of merchant name candidates increases. Specifically, the number of candidates determined by selecting from a large merchant data store (see selection technique 502) might number in the thousands or more. When a different selection technique is used, such as a selection technique that includes consideration of the city and/or state location (see selection technique 504 and see selection technique 506) the number of candidates is reduced. Further, when a still different selection technique is used, such as a selection technique that includes consideration of content of a user profile and/or consideration of a time-of-day or date stamp (see selection technique 508, and see selection technique 510, respectively) the number of candidates is even further reduced. In some cases a candidate can be determined by selecting after a user confirmation. Moreover, a user confirmation (see selection technique 512), which confirmation can be stored in a user profile, can be used in combination with any other selection technique to produce unambiguous results.

Figure 6A:
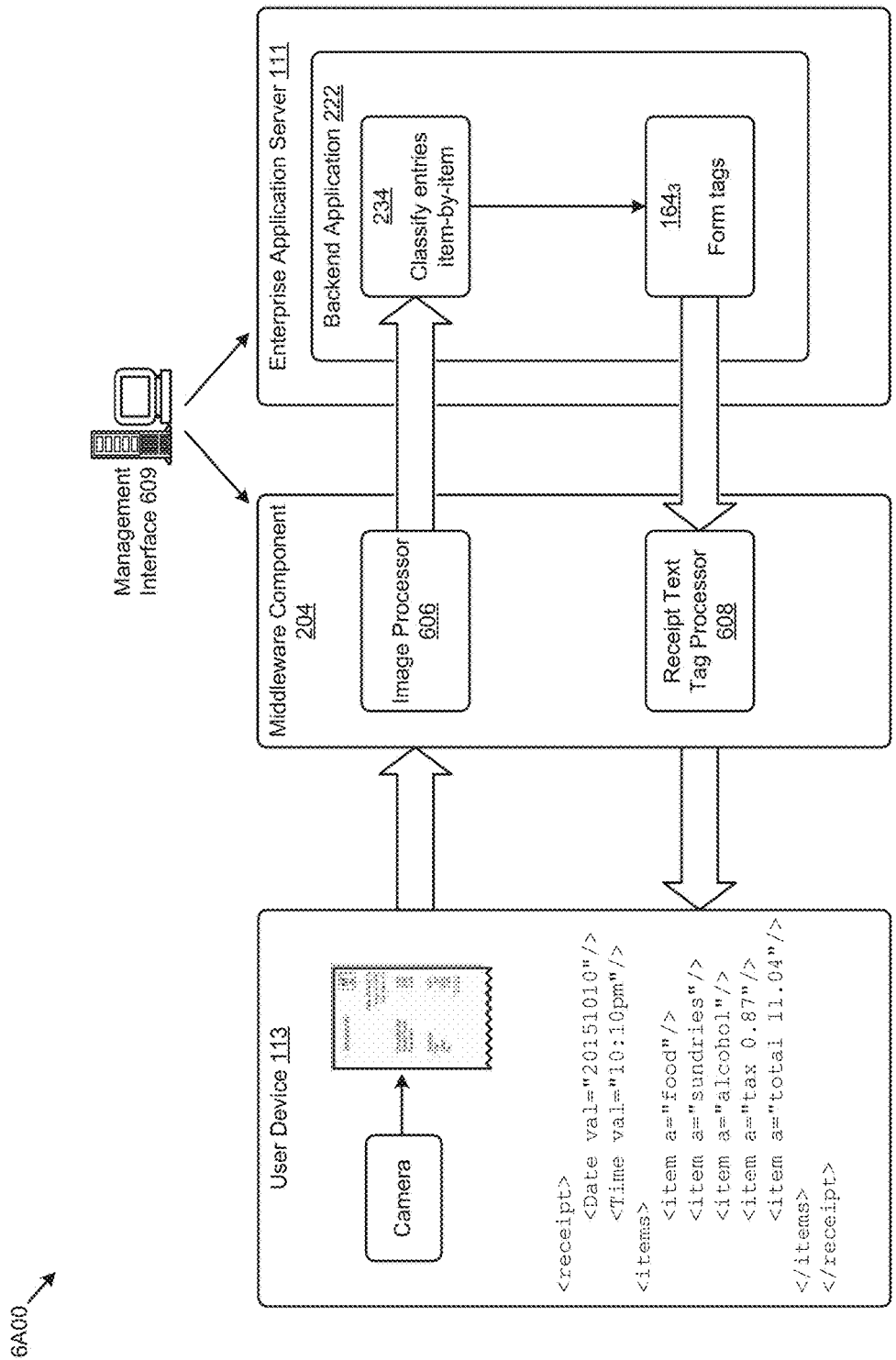
FIG. 6A presents a server-side implementation of portions of an application to achieve high-accuracy markup language classification of expense items based on merchant identification.

FIG. 6A presents a server-side implementation 6A00 of portions of an application to achieve high-accuracy markup language classification of expense items based on merchant identification. As an option, one or more variations of server-side implementation 6A00 or any aspect thereof may be implemented in the context of the architecture and functionality of the embodiments described herein. Also, the server-side implementation 6A00 or any aspect thereof may be implemented in any environment.

The server-side implementation 6A00 is merely one embodiment. In this exemplary partitioning, the enterprise application server 111 hosts backend application 222, which in turn includes steps to classify entries (see step 234) and steps to form tags (e.g., see step $164_3$). The enterprise application server can receive the outputs of a middleware component 204, which outputs can include results of image processor 606. The outputs of backend application 222 can include tags that are passed to a receipt text tag processor 608. The middleware component 204 interacts with a user device 113 to deliver expense items in the form of a markup language document. As shown, the user device receives a markup language document than gives a date indication (e.g., "20151010"), a time indication (e.g., "10:10 pm"), a listing of three classified and typed items (e.g., "food", "sundries", and "alcohol"). The markup includes a tax amount (e.g., "0.87") and a total (e.g., "11.04").

In some embodiments, the image processor 606 and/or receipt text tag processor 608 can be configured using a management interface 609. Moreover, any aspect of the operation of a middleware component 204 and/or the enterprise application server 111 or backend application 222 can be can be configured using a management interface 609.

Figure 6B:
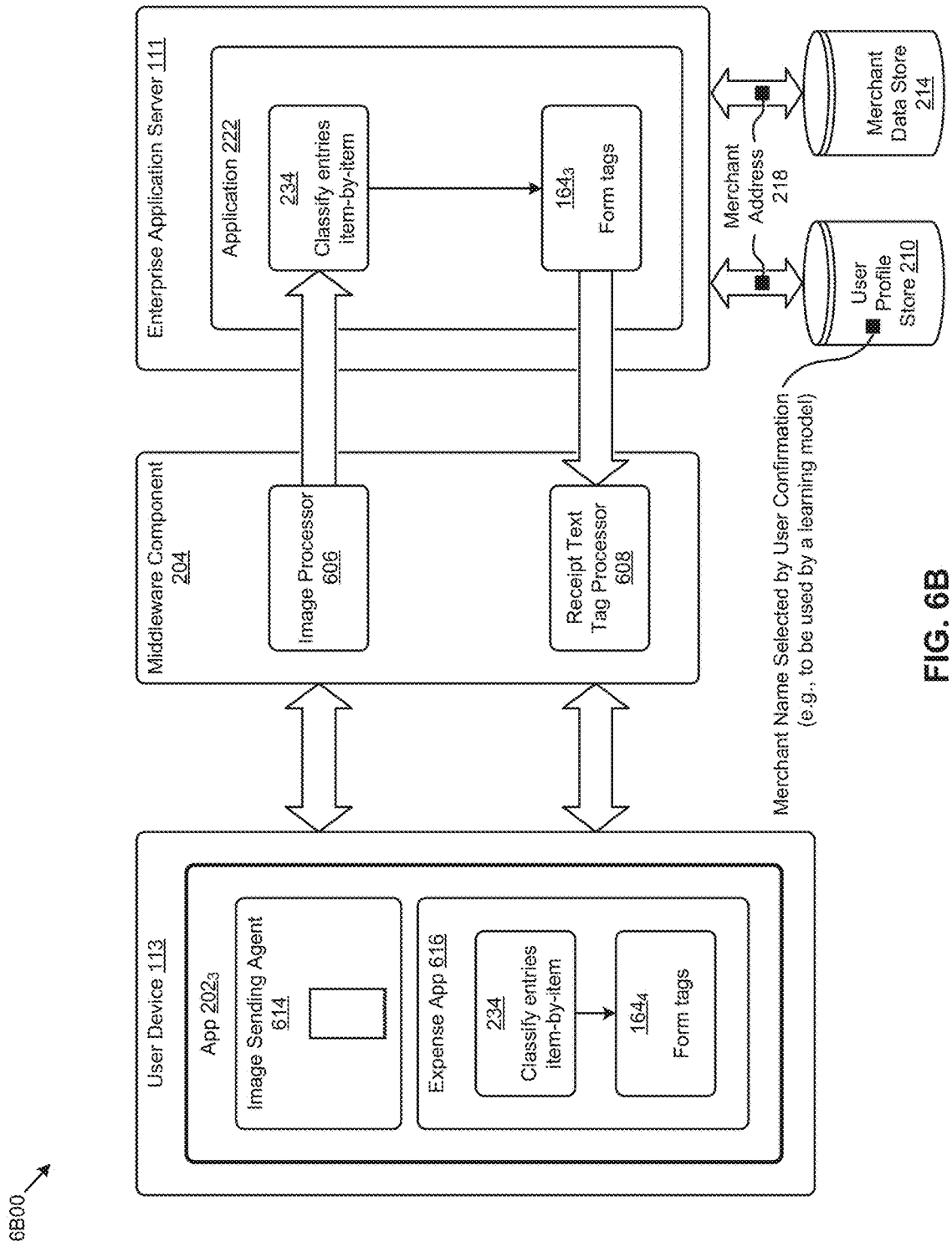
FIG. 6B presents a client-side implementation of portions of an application to achieve high-accuracy markup language classification of expense items based on merchant identification.

FIG. 6B presents a client-side implementation 6B00 of portions of an application to achieve high-accuracy markup language classification of expense items based on merchant identification. As an option, one or more variations of client-side implementation 6B00 or any aspect thereof may be implemented in the context of the architecture and functionality of the embodiments described herein. Also, the client-side implementation 6B00 or any aspect thereof may be implemented in any environment.

The embodiment shown in FIG. 6B is merely one example. The client-side implementation 6B00 is merely one embodiment. In this exemplary partitioning, the user device 113 hosts an app $202_3$ which in turn includes an agent for image sending 614 as well as an expense app 616. The user device can receive the outputs of a middleware component 204, which outputs can include results of any forms of processing by the enterprise application server 111, possibly including processing of data from user profile store 210 (e.g., user profile records $208_3$, user profile records $208_4$, etc.) and/or possibly including processing of data from merchant data store 214 (as shown). The processing of expense app 616 can include steps for item-by-item classification of entries (e.g., see step 234), and steps for determination and formation of tags (e.g., see step $164_4$). As such, many aspects of expense tracking can be performed on user device 113.

Indeed, the herein-disclosed statistical techniques, spatial techniques and distance-based scoring techniques can be used to disambiguate in many domains. The techniques for generating metadata and/or markup language representation are not limited to expense item receipts. For example, the aforementioned techniques can be combined so as to process mileage incurred, even from a photo of a handwritten note or log, or from a photo of an address (e.g., as might be found on a business card). Moreover, a mileage tracker app and/or application can be implemented in the heretofore-described environments. A mileage tracker app allows users to start their maps through mobile interface (e.g., by uploading a photo of a start address). Such a mileage tracker can track the trip to its termination, then automatically create an expense item pertaining to mileage and other aspects of a trip. A mobile-terminal app can automatically pause tracking when vehicle is idle, and/or can automatically tracks route segments (e.g., respective segment times and segment distances). A mobile-terminal app can recognize the beginning of a new trip or a continuation of a previous trip. Upon completion of a trip, user can view the route segments and remove or otherwise edit route segments (e.g., segments that are not applicable for expense reimbursement such as a side-trip taken for personal purposes). A pictorial snapshot of the route can be output (e.g., for possible inclusion as an attachment to an expense report).

ADDITIONAL EMBODIMENTS OF THE DISCLOSURE

Additional Practical Application Examples

Figure 7A:
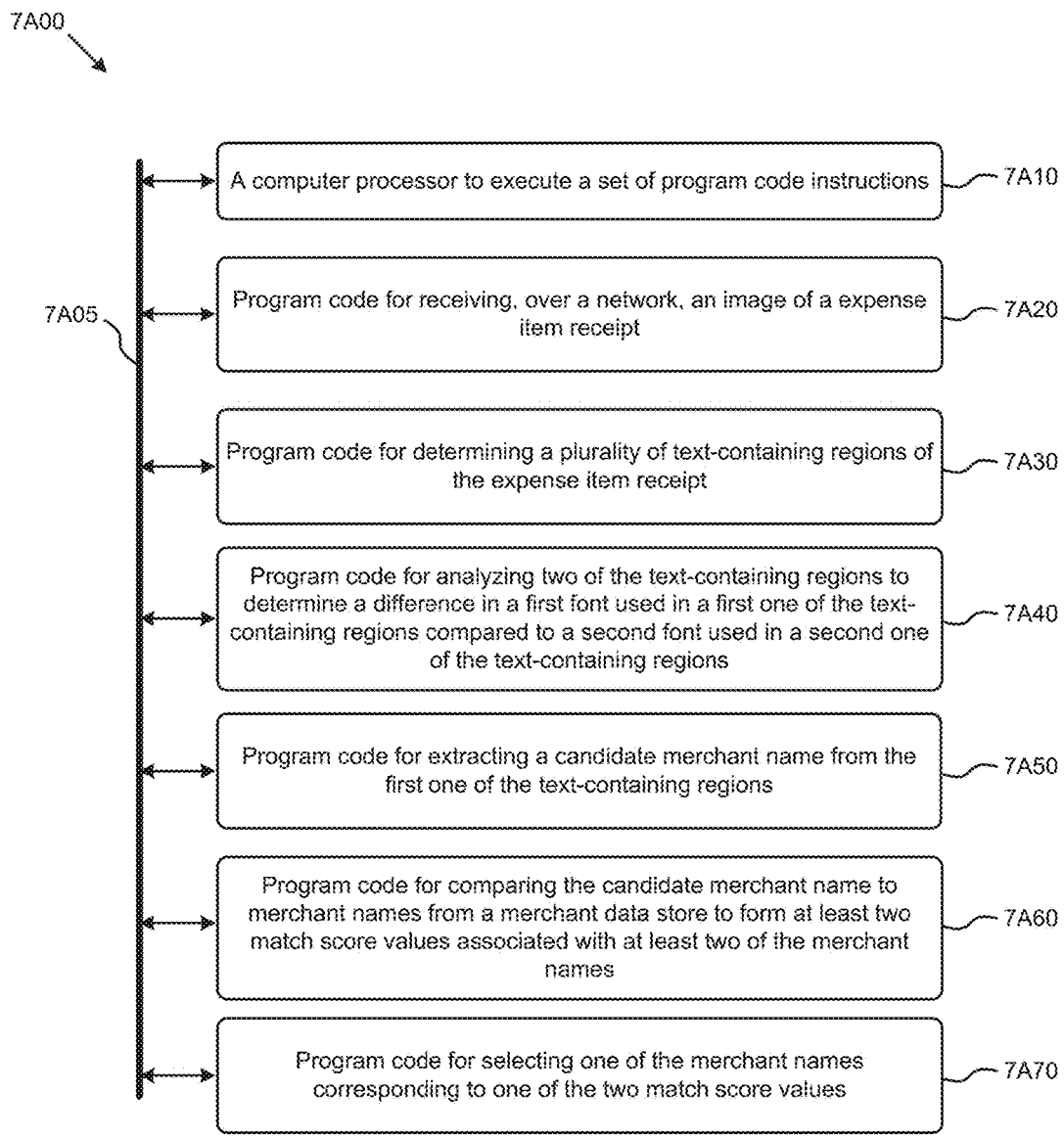
FIG. 7A and FIG. 7B depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. The partitioning of system 7A00 is merely illustrative and other partitions are possible. As an option, the present system 7A00 may be implemented in the context of the architecture and functionality of the embodiments described herein. Of course, however, the system 7A00 or any operation therein may be carried out in any desired environment.

The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising a computer processor to execute a set of program code instructions (see module 7A10) and modules for accessing memory to hold program code instructions to perform: receiving, over a network, an image of a expense item receipt (see module 7A20); determining a plurality of text-containing regions of the expense item receipt (see module 7A30); analyzing two of the text-containing regions to determine a difference in a first font used in a first one of the text-containing regions compared to a second font used in a second one of the text-containing regions (see module 7A40); extracting a candidate merchant name from the first one of the text-containing regions (see module 7A50); comparing the candidate merchant name to merchant names from a merchant data store to form at least two match score values associated with at least two of the merchant names (see module 7A60); and selecting one of the merchant names corresponding to one of the two match score values (see module 7A70).

Figure 7B:
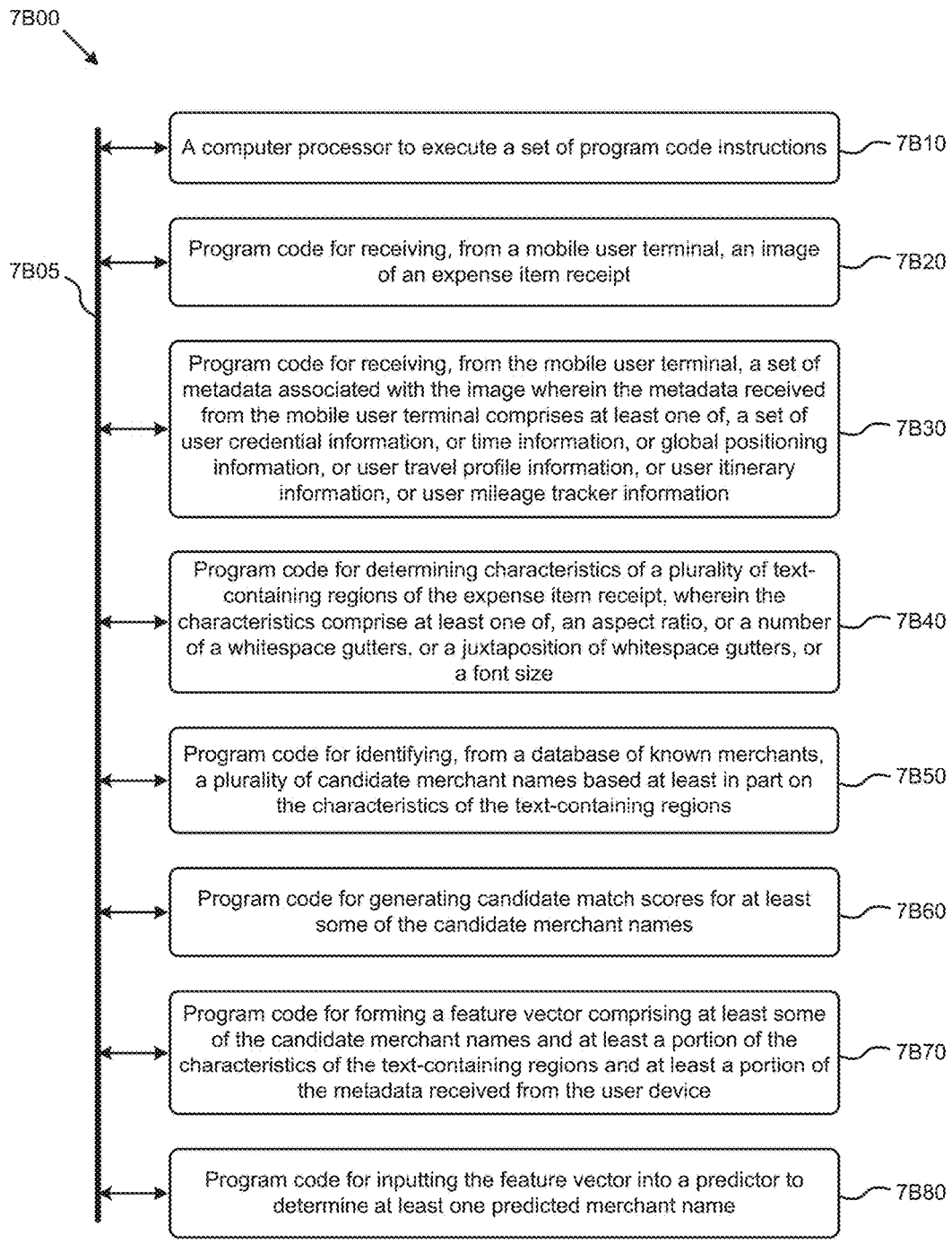

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible. As an option, the present system 7B00 may be implemented in the context of the architecture and functionality of the embodiments described herein. Of course, however, the system 7B00 or any operation therein may be carried out in any desired environment.

The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with other operations over communication path 7B05. The modules of the system can, individually or in combination, perform method operations within system 7B00. Any operations performed within system 7B00 may be performed in any order unless as may be specified in the claims.

The shown embodiment implements a portion of a computer system, presented as system 7B00, comprising a computer processor to execute a set of program code instructions (see module 7B 10) and modules for accessing memory to hold program code instructions to perform: receiving, from a mobile user terminal, an image of an expense item receipt (see module 7B20); receiving, from the mobile user terminal, a set of metadata associated with the image wherein the metadata received from the mobile user terminal comprises at least one of, a set of user credential information, or time information, or global positioning information, or user travel profile information, or user itinerary information, or user mileage tracker information (see module 7B30); determining characteristics of a plurality of text-containing regions of the expense item receipt, wherein the characteristics comprise at least one of, an aspect ratio, or a number of whitespace gutters, or a juxtaposition of whitespace gutters, or a font size (see module 7B40); identifying, from a database of known merchants, a plurality of candidate merchant names based at least in part on the characteristics of the text-containing regions (see module 7B50); generating candidate match scores for at least some of the candidate merchant names (see module 7B60); forming a feature vector comprising at least some of the candidate merchant names and at least a portion of the characteristics of the text-containing regions and at least a portion of the metadata received from the user device (see module 7B70); and inputting the feature vector into a predictor to determine at least one predicted merchant name (see module 7B80).

System Architecture Overview

Additional System Architecture Examples

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a CPU, or a multi-core CPU (e.g., data processor 807), a system memory (e.g., main memory 808, or an area of random access memory (RAM)), a non-volatile storage device or non-volatile storage area (e.g., read-only memory 809), an internal or external storage device 810 (e.g., magnetic or optical), a data interface 833, a communications interface 814 (e.g., PHY, MAC, Ethernet interface, modem, etc.). The aforementioned components are shown within processing element partition 801, however other partitions are possible. The shown computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of the communications interface 814 may comprise one or more networking ports that are configurable (e.g., pertaining to speed, protocol, physical layer characteristics, media access characteristics, etc.) and any particular instance of the communications interface 814 or port thereto can be configured differently from any other particular instance. Portions of a communication protocol can be carried out in whole or in part by any instance of the communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

The communications link 815 can be configured to transmit (e.g., send, receive, signal, etc.) any types of communications packets 838 comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases the packet characteristics include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages such as data and/or instructions organized into a data structure (e.g., communications packets 838). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

The processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). A module may include one or more state machines and/or combinational logic used to implement or facilitate the performance characteristics of high-accuracy markup language tagging of expense items based on merchant identification.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of high-accuracy markup language tagging of expense items based on merchant identification). Such files or records can be brought into and/or stored in volatile or non-volatile memory.

Figure 8B:
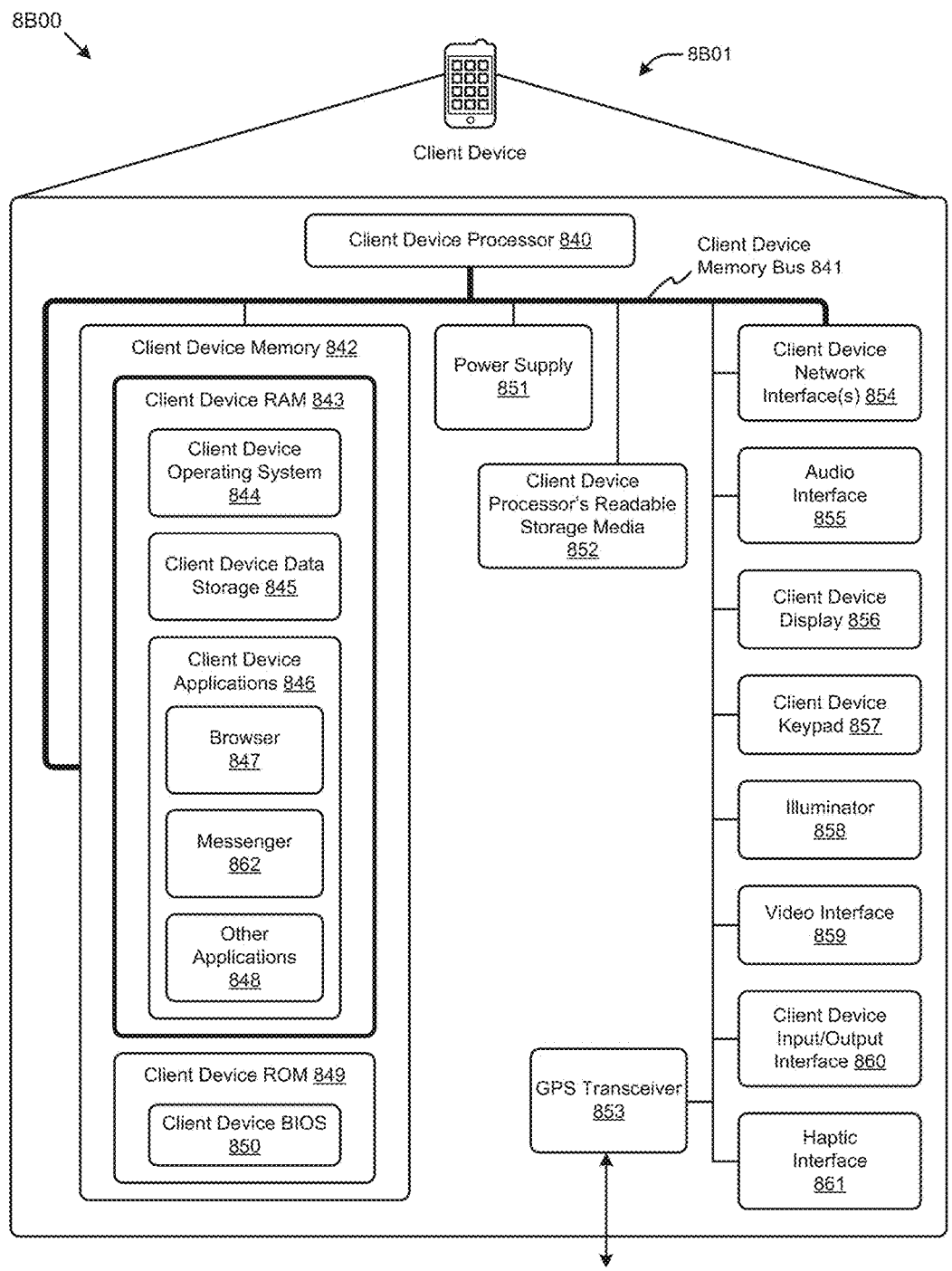

FIG. 8B depicts a block diagram 8B00 of an instance of a client device 8B01 that may be included in a system implementing instances of the herein-disclosed embodiments. Client device 8B01 may include many more or fewer components than those shown in FIG. 8B. Client device 8B01 may represent, for example, an embodiment of at least one of client devices as heretofore disclosed.

As shown in the figure, client device 8B01 includes a client device processor 840 in communication with a client device memory 842 via a client device memory bus 841. Client device 8B01 also includes a power supply 851, one or more client device network interfaces 854, an audio interface 855, a client device display 856, a client device keypad 857, an illuminator 858, a video interface 859, a client device IO interface 860, a haptic interface 861, and a GPS transceiver 853 for global positioning services.

The power supply 851 provides power to client device 8B01. A rechargeable or non-rechargeable battery may be used to provide power. The power may also be provided by an external power source such as an AC adapter or a powered docking cradle that supplements and/or recharges a battery.

A client device 8B01 may optionally communicate with a base station, or directly with another computing device. A client device network interface 854 includes circuitry for coupling a client device 8B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), IEEE 802.16 Worldwide Interoperability for Microwave Access (WiMax), session initiated protocol/real-time transport protocol (SIP/RTP), or any of a variety of other wireless communication protocols. A client device network interface is sometimes known as a transceiver, a transceiving device, or a network interface card (NIC).

An audio interface 855 is arranged to produce and receive audio signals such as the sound of a human voice. For example, audio interface 855 may be coupled to a speaker and microphone to enable telecommunication with others and/or generate an audio acknowledgement for some action.

A client device display 856 may be a liquid crystal display (LCD), gas plasma, light emitting diode (LED), or any other type of display used with a computing device. A client device display 856 may also include a touch sensitive screen arranged to receive input from an object such as a stylus or a digit from a human hand.

A client device keypad 857 may comprise any input device arranged to receive input from a user. For example, client device keypad 857 may include a push button numeric dial, or a keyboard. A client device keypad 857 may also include command buttons that are associated with selecting and sending images.

An illuminator 858 may provide a status indication and/or provide light. Illuminator 858 may remain active for specific periods of time or in response to events. For example, when the illuminator 858 is active, it may backlight the buttons on client device keypad 857 and stay on while the client device is powered. Also, the illuminator 858 may backlight these buttons in various patterns when particular actions are performed such as dialing another client device. An illuminator 858 may also cause light sources positioned within a transparent or translucent case of the client device to illuminate in response to actions.

A video interface 859 is arranged to capture video images such as a still photo, a video segment, an infrared video or the like. For example, the video interface 859 may be coupled to a digital video camera, a web-camera or the like. A video interface 859 may comprise a lens, an image sensor, and other electronics. Image sensors may include a complementary metal-oxide-semiconductor (CMOS) integrated circuit, charge-coupled device (CCD), or any other integrated circuit for sensing light.

Some instances of the shown client device 8B01 comprise a client device IO interface 860 for communicating with external devices such as a headset, or other input or output devices not shown in FIG. 8B. The client device IO interface 860 can use one or more communication technologies such as a USB, infrared, Bluetooth™ port or the like. A haptic interface 861 is arranged to as a human interface device (HID) to facilitate interaction with a user of a client device. Such interaction can include tactile feedback to a user of the client device. For example, the haptic interface 861 may be employed to cause vibration of the client device 8B01 in a particular way (e.g., with a pattern or periodicity) and/or when interacting with one or another user.

A GPS transceiver 853 can determine the physical coordinates of client device 8B01 on the surface of the Earth. The GPS transceiver 853, in some embodiments, may be optional. The shown GPS transceiver 853 outputs a location such as a latitude value and a longitude value. However, the GPS transceiver 853 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 8B01 on the surface of the Earth. It is understood that under different conditions, a GPS transceiver 853 can determine a physical location within millimeters for client device 8B01; and in other cases, the determined physical location may be less precise such as within a meter or significantly greater distances. In certain embodiments, the client device 8B01 may provide other information that may be employed to determine a physical location of the device including, for example, a media access control (MAC) address, IP address, IP port identifier, or the like.

The client device memory 842 includes random access memory 843, read-only memory 849, and other computer-readable storage. The client device memory 842 illustrates an example of computer readable storage media (devices) for storage of information such as computer readable instructions, data structures, program modules or other data. The client device memory 842 stores a basic IO system (BIOS) in the embodiment of client device BIOS 850 for controlling low-level operation of client device 8B01. The memory also stores an operating system 844 for controlling the operation of client device 8B01. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the Symbian® operating system. The operating system may include or interface with a Java virtual machine module that enables control of hardware components and/or operating system operations via Java application programs.

The client device memory 842 further includes one or more instances of client device data storage 845, which can be used by client device 8B01 to store, among other things, client device applications 846 and/or other data. For example, client device data storage 845 may also be employed to store information that describes various capabilities of client device 8B01. The information may then be provided to another device based on any of a variety of events including being sent as part of a header during a communication, sent upon request or the like. Client device data storage 845 may also be employed to store social networking information including address books, buddy lists, aliases, user profile information or the like. Further, client device data storage 845 may also store messages, web page content, or any of a variety of content (e.g., received content, user generated content, etc.).

At least a portion of the information may also be stored on any component or network device including, but not limited, to a client device processor's readable storage media, a disk drive or other computer readable storage devices within client device 8B01, etc.

An instance of a client device processor's readable storage media 852 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store information and which can be accessed by a computing device. The aforementioned readable storage media may also be referred to herein as computer readable storage media.

The client device applications 846 may include computer executable instructions which, when executed by client device 8B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 846 may include, for example, a messenger 862, a browser 847, and other applications 848. Certain instances of other applications 848 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, the applications may collect and store user data that may be received from other computing devices in the environment.

A messenger 862 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in certain embodiments, the messenger 862 may be configured as an IM application such as AOL (America Online) instant messenger, Yahoo! messenger, .NET messenger server, ICQ or the like. In certain embodiments, the messenger 862 may be configured to include a mail user agent (MUA) such as Elm, Pine, message handling (MH), Outlook, Eudora, Mac Mail, Mozilla Thunderbird or the like. In another embodiment, the messenger 862 may be a client device application that is configured to integrate and employ a variety of messaging protocols including, but not limited, to various push and/or pull mechanisms for client device 8B01. In certain embodiments, the messenger 862 may interact with the browser 847 for managing messages. As used herein, the term "message" refers to any of a variety of messaging formats, or communications form including, but not limited to, email, SMS, IM, MMS, IRC or the like.

A browser 847 may include virtually any application configured to receive and display graphics, text, multimedia, messages and the like, employing virtually any web based language. In certain embodiments, the browser application is enabled to employ HDML, WML, WMLScript, JavaScript, SGML, HTML, XML and the like, to display and send a message. However, any of a variety of other web-based programming languages may be employed. In certain embodiments, a browser 847 may enable a user of client device 8B01 to communicate with another network device as may be present in the environment.

Figure 8C:
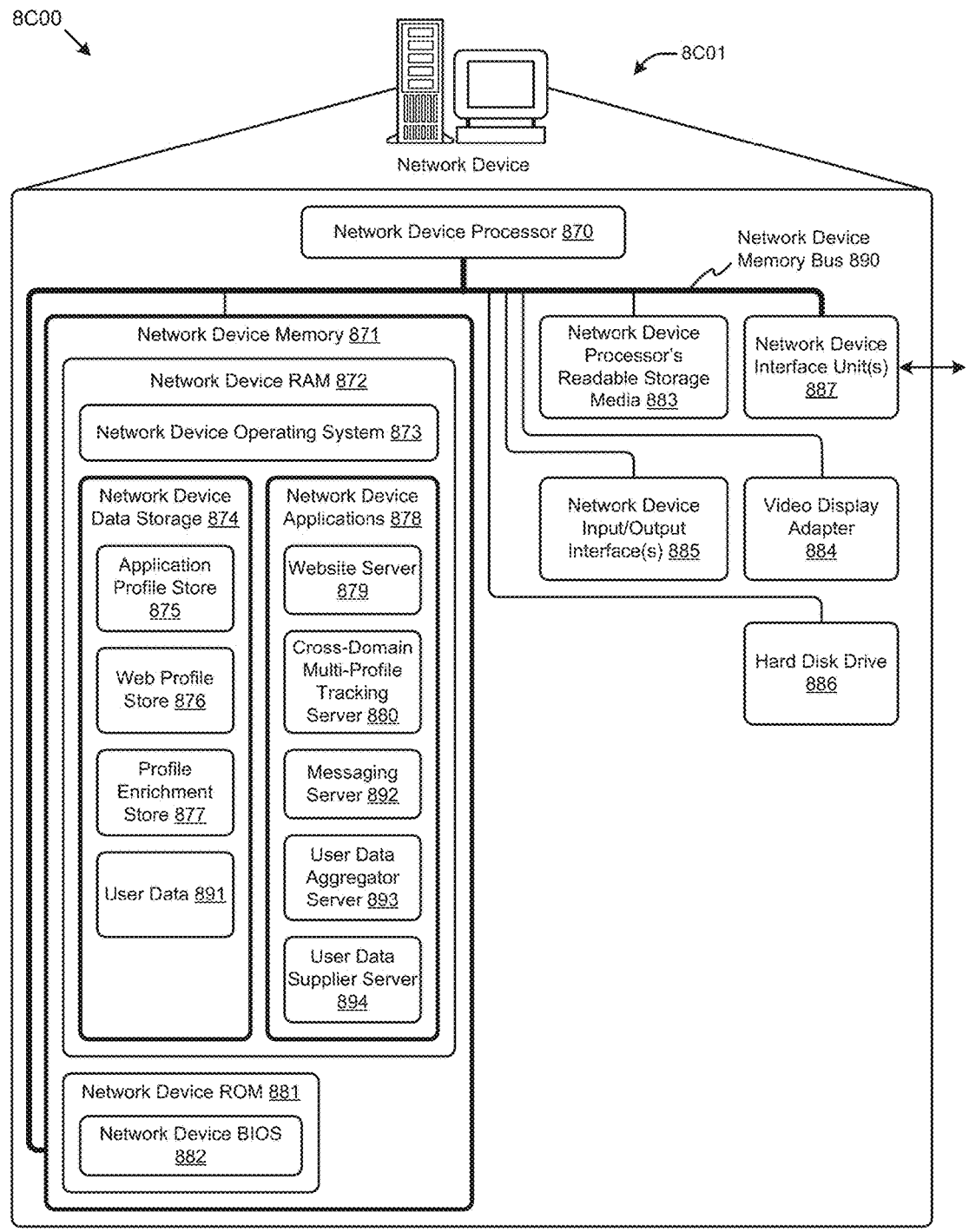

FIG. 8C depicts a block diagram 8C00 of an instance of a network device 8C01 that may be included in a system implementing instances of the herein-disclosed embodiments. Network device 8C01 may include many more or fewer components than those shown. Network device 8C01 may be configured to operate as a server, client, peer, a host, or any other device.

The network device 8C01 includes at least one instance of a network device processor 870, instances of readable storage media, one or more instances of a network interface unit 887, a network device IO interface 885, a hard disk drive 886, a video display adapter 884, and a network device memory 871, all in communication with each other via a network device memory bus 890. The network device memory generally includes network device RAM 872, network device ROM 881. Some embodiments include one or more non-volatile mass storage devices such as a hard disk drive 886, a tape drive, an optical drive, and/or a floppy disk drive. The network device memory stores a network device operating system 873 for controlling the operation of network device 8C01. Any general-purpose operating system may be employed. A basic input/output system (BIOS) is also provided in the form of network device BIOS 882 for controlling the low-level operation of network device 8C01. As illustrated in FIG. 8C, a network device 8C01 also can communicate with the Internet, or some other communications network, via a network interface unit 887, which is constructed for use with various communication protocols including the TCP/IP protocol. A network interface unit 887 is sometimes known as a transceiver, a transceiving device, or a network interface card (NIC). Network device 8C01 also comprises a network device IO interface 885 for communicating with external devices such as a keyboard or other input or output devices. A network device IO interface 885 can use one or more communication technologies such as USB, infrared, Bluetooth™ or the like.

The storage devices as described above may use various types of computer readable media, namely tangible forms of non-volatile computer readable storage media and/or a client device processor's readable storage media 852 and/or a network device processor's readable storage media 883. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store information and which can be accessed by a computing device.

As shown, network device data storage 874 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 874 may further include program code, data, algorithms and the like, for use by a processor such as a network device processor 870 to execute and perform actions. In certain embodiments, at least some of the logical contents of network device data storage 874 might be stored on another component of network device 8C01 such as on a second instance of hard disk drive 886 or on an external/removable storage device.

The network device data storage 874 may further store any portions of application data and/or user data such as an application profile store 875, a web profile store 876, a profile enrichment store 877 and/or any user data collected. In some embodiments, user data 891 may store unique user data, non-unique user data, aggregated user data, and/or any combination thereof. User data 891 may include a variety of attributes such as a five digit zip code, an expanded nine digit zip code and the like.

The Network device data storage 874 may also store program code and data. One or more network device applications 878 may be loaded into network device data storage or any other mass memory, to be accessible to run with or as a part of network device operating system 873. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 892, website server 879, user data aggregator server 893, a cross-domain multi-profile tracking server 880, and/or user data supplier server 894 may also be included within or implemented as application programs.

A messaging server 892 may include virtually any computing component or components configured and arranged to forward messages from message user agents and/or other message servers, or to deliver messages to a local message store such as network device data storage 874 or the like. Thus, a messaging server 892 may include a message transfer manager to communicate a message employing any of a variety of email protocols including, but not limited to, simple mail transfer protocol (SMTP), post office protocol (POP), Internet message access protocol (IMAP), network news transfer protocol (NNTP) or the like. A messaging server 892 may also be managed by one or more components of the messaging server 892. Thus, the messaging server 892 may also be configured to manage SMS messages; IM, MMS, IRC, or RSS feeds; mIRC; or any of a variety of other message types. In certain embodiments, the messaging server 892 may enable users to initiate and/or otherwise conduct chat sessions, VOIP sessions or the like.

A website server 879 may represent any of a variety of information and services that are configured to provide content, including messages, over a network to another computing device. Thus, a website server 879 can include, for example, a web server, a file transfer protocol (FTP) server, a database server, a content server or the like. A website server 879 may provide the content including messages over the network using any of a variety of formats including, but not limited to WAP, HDML, WML, SGML, HTML, XML, compact HTML (cHTML), extensible HTML (xHTML) or the like. A website server 879 may also be configured to enable a user of a client device to browse websites, upload user data, view and interact with advertisements or the like.

A user data aggregator server 893 is configured to aggregate user data to be provided to user data buyers for advertising campaigns. In certain embodiments, a user data aggregator server 893 may be configured to receive collected user data from a user data supplier server 894. In some embodiments, a user data aggregator server 893 may receive a query for user data. Based on the query, a user data aggregator server 893 may generate a plurality of subsets of aggregated user data. In some embodiments, user data aggregator server 893 may be included in a network device.

A user data supplier server 894 is configured to collect user data. In certain embodiments, the user data supplier server 894 may be configured to provide the collected user data to user data aggregator server 893. In some embodiments, the user data supplier server 894 may collect and/or provide unique user data and/or non-unique user data. In certain embodiments, the user data supplier server 894 may aggregate the collected user data. In some embodiments, the user data supplier server 894 may be included in any computing device such as heretofore described.

Returning to discussion of the heretofore introduced environments, the environments include components with which various systems can be implemented. Not all of the components shown may be required to practice the embodiments, and variations in the arrangement and type of the components may be made without departing from the spirit or scope of the disclosure.

Various environments in which embodiments of the disclosure operate may include local area networks (LANs)/wide area networks (WANs), wireless networks, client devices (e.g., user stations). The overall network, including any sub-networks and/or wireless networks, are in communication with, and enables communication between components in the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In certain embodiments, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In certain embodiments, a user of the client device may employ the browser application to perform various activities over a network (online). However, another application may also be used to perform various online activities.

Client devices may include at least one client application that is configured to receive and/or send data between other computing devices (e.g., server components). The client application may include a capability to provide send and/or receive content or the like. The client application may further provide information that identifies itself including a type, capability, name or the like. In certain embodiments, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In certain embodiments, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between any other computing devices and/or over or between other networks or network components.

Any of the foregoing networks can be configured to couple network devices with other computing devices and communication can include communicating over the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communications links within LANs may include twisted wire pair or coaxial cable, while communications links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communications links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In various embodiments, network 108 may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
receiving, from a user device over a network, an image captured at the user device using a digital camera of the user device, the user device comprising a mobile device coupled to a processing application over the network, the processing application executing on a server device;
receiving, by the processing application of the server device and from the user device over the network, a set of metadata associated with the image, the set of metadata comprising at least some information derived from one or more mobile applications that are hosted on the user device;
determining, by the processing application of the server device, characteristics of a plurality of text-containing regions of the image received from the user device over the network;
forming, by the processing application of the server device, a feature vector comprising at least a portion of the characteristics and at least a portion of the set of metadata associated with the image, the set of metadata derived from the one or more mobile applications and received from the user device over the network; and
inputting the feature vector into a predictor at the processing application of the server device to determine at least one predicted matching identifier based on at least the set of metadata associated with the image, the set of metadata derived from the one or more mobile applications and received from the user device over the network, wherein the at least one predicted matching identifier is identified from a set of identifiers stored in a database coupled to the server device.

2. The method of claim 1, wherein the set of metadata received from the user device comprises at least one of, a set of user credential information, or time information, or global positioning information, or user travel profile information, or user itinerary information, or user mileage tracker information, or any combination thereof.

3. The method of claim 2, wherein the user itinerary information is derived from a mileage tracker app running on the user device and the user travel profile information is derived from a travel app running on the user device.

4. The method of claim 1,
wherein:
the feature vector does not contain a candidate matching identifier, and the feature vector further comprises at least one of, captured image features, or historical features, or temporal features, or topological features, or preference features, or exogenous features, or any combination thereof,
the set of metadata associated with the image comprises at least one of, a set of user credential information, or time information, or global positioning information, or user travel profile information, or user itinerary information, or user mileage tracker information, the user itinerary information is derived from a mileage tracker application running on the user device, the user travel profile information is derived from a travel application running on the user device,
determining characteristics of a plurality of text-containing regions of the image, text-containing regions comprising at least one of, an aspect ratio, or a number of a whitespace gutters, or a juxtaposition of whitespace gutters, or a font size,
the feature vector further comprises at least some of the candidate matching identifiers and at least a portion of the characteristics of the text-containing regions,
the predictor is formed using a model generator and a model validator by implementing a machine learning process including inputting a sequence of vectors into the model generator, the sequence of vectors comprising a codification of a set of features pertaining to one or more previously captured images, the sequence of vectors pertaining to at least one of historical items, temporal features, topological features, preference features, exogenous features, the model generator correlating a first portion of input vectors with known correct results to form a trained predictive model, the model validator uses a second portion of input vectors and a portion of known correct results to validate the trained predictive model to a predetermined level of precision, and the predictor comprising at least the validated trained predictive model,
the predictor using a selection technique to reduce a number of identifiers, wherein the selection technique uses information from at least the set of metadata to identify possible matches from a larger set, and
the image and the set of metadata is routed through a middleware component to a server having the processing application, the processing application outputting tags generated based on the image, the tags being transmitted to the user device through the middleware component in a markup language document; and further comprising:
comparing the predicted matching identifier to identifiers from a identifier data store to form at least two match score values associated with at least two of the identifiers,
selecting one of the identifiers corresponding to one of the predicted matching identifiers,
forming a markup language document that comprises at least one of the at least one predicted matching identifier,
identifying, from a database of known identifiers, a plurality of candidate matching identifiers based at least in part on the characteristics of the text-containing regions, and
generating candidate match scores for at least some of the candidate matching identifiers.

5. The method of claim 1 wherein the feature vector does not contain a candidate matching identifier.

6. The method of claim 1, further comprising:
comparing the predicted matching identifier to identifiers from a identifier data store to form at least two match score values associated with at least two of the identifiers; and
selecting one of the identifiers corresponding to one of the predicted matching identifiers.

7. The method of claim 1, wherein the predictor is formed using a model generator.

8. The method of claim 1, wherein the feature vector further comprises at least one of, captured image features, or historical features, or temporal features, or topological features, or preference features, or exogenous features, or any combination thereof.

9. The method of claim 1, further comprising forming a markup language document that comprises at least one of the at least one predicted matching identifier.

10. The method of claim 1:
wherein the user device is a mobile user terminal, and
wherein the set of metadata associated with the image comprises at least one of, a set of user credential information, or time information, or global positioning information, or user travel profile information, or user itinerary information, or user mileage tracker information; and
wherein determining characteristics of a plurality of text-containing regions of the image, comprise at least one of, an aspect ratio, or a number of a whitespace gutters, or a juxtaposition of whitespace gutters, or a font size; and
further comprising:
identifying, from a database of known merchants, a plurality of candidate-matching identifiers based at least in part on the characteristics of the text-containing regions; and
generating candidate match scores for at least some of the candidate matching identifiers; and
wherein forming the feature vector comprises at least some of the candidate-matching identifiers and at least a portion of the characteristics of the text-containing regions and at least a portion of the set of metadata received from the user device.

11. A non-transitory computer readable medium, the non-transitory computer readable medium having stored thereon a sequence of instructions which, when executed by a processor causes the processor to perform a set of acts, the set of acts comprising:
receiving, from a user device over a network, an image captured at the user device using a digital camera of the user device, the user device comprising a mobile device coupled to a processing application over the network, the processing application executing on a server device;
receiving, by the processing application of the server device and from the user device over the network, a set of metadata associated with the image, the set of metadata comprising at least some information derived from one or more mobile applications that are hosted on the user device;
determining, by the processing application of the server device, characteristics of a plurality of text-containing regions of the image received from the user device over the network;
forming, by the processing application of the server device, a feature vector comprising at least a portion of the characteristics and at least a portion of the set of metadata associated with the image, the set of metadata derived from the one or more mobile applications and received from the user device over the network; and
inputting the feature vector into a predictor at the processing application of the server device to determine at least one predicted matching identifier based on at least the set of metadata associated with the image, the set of metadata derived from the one or more mobile applications and received from the user device over the network, wherein the at least one predicted matching identifier is identified from a set of identifiers stored in a database coupled to the server device.

12. The computer readable medium of claim 11, wherein the set of metadata received from the user device comprises at least one of, a set of user credential information, or time information, or global positioning information, or user travel profile information, or user itinerary information, or user mileage tracker information, or any combination thereof.

13. The computer readable medium of claim 12, wherein the user itinerary information is derived from a mileage tracker app running on the user device and the user travel profile information is derived from a travel app running on the user device.

14. The computer readable medium of claim 11,
wherein:
the feature vector does not contain a candidate matching identifier, and the feature vector further comprises at least one of, captured image features, or historical features, or temporal features, or topological features, or preference features, or exogenous features, or any combination thereof,
the set of metadata associated with the image comprises at least one of, a set of user credential information, or time information, or global positioning information, or user travel profile information, or user itinerary information, or user mileage tracker information, the user itinerary information is derived from a mileage tracker application running on the user device, the user travel profile information is derived from a travel application running on the user device,
determining characteristics of a plurality of text-containing regions of the image, text-containing regions comprising at least one of, an aspect ratio, or a number of a whitespace gutters, or a juxtaposition of whitespace gutters, or a font size,
the feature vector further comprises at least some of the candidate matching identifiers and at least a portion of the characteristics of the text-containing regions,
the predictor is formed using a model generator and a model validator by implementing a machine learning process including inputting a sequence of vectors into the model generator, the sequence of vectors comprising a codification of a set of features pertaining to one or more previously captured images, the sequence of vectors pertaining to at least one of historical items, temporal features, topological features, preference features, exogenous features, the model generator correlating a first portion of input vectors with known correct results to form a trained predictive model, the model validator uses a second portion of input vectors and a portion of known correct results to validate the trained predictive model to a predetermined level of precision, and the predictor comprising at least the validated trained predictive model,
the predictor using a selection technique to reduce a number of identifiers, wherein the selection technique uses information from at least the set of metadata to identify possible matches from a larger set, and
the image and the set of metadata is routed through a middleware component to a server having the processing application, the processing application outputting tags generated based on the image, the tags being transmitted to the user device through the middleware component in a markup language document; and
the set of acts further comprising:
comparing the predicted matching identifier to identifiers from a identifier data store to form at least two match score values associated with at least two of the identifiers, selecting one of the identifiers corresponding to one of the predicted matching identifiers, forming a markup language document that comprises at least one of the at least one predicted matching identifier, identifying, from a database of known identifiers, a plurality of candidate matching identifiers based at least in part on the characteristics of the text-containing regions, and generating candidate match scores for at least some of the candidate matching identifiers.

15. The computer readable medium of claim 11, the set of acts further comprising:

comparing the predicted matching identifier to identifiers from a identifier data store to form at least two match score values associated with at least two of the identifiers; and selecting one of the identifiers corresponding to one of the predicted matching identifiers.

16. The computer readable medium of claim 11, wherein the feature vector further comprises at least one of, captured image features, or historical features, or temporal features, or topological features, or preference features, or exogenous features, or any combination thereof.

17. The computer readable medium of claim 11, the set of acts further comprising forming a markup language document that comprises at least one of the at least one predicted matching identifier.

18. A system comprising:

a storage medium having stored thereon a sequence of instructions; and a processor or processors that execute the sequence of instructions to cause the processor or processors to perform a set of acts, the set of acts comprising:

receiving, from a user device over a network, an image captured at the user device using a digital camera of the user device, the user device comprising a mobile device coupled to a processing application over the network, the processing application executing on a server device;

receiving, by the processing application of the server device and from the user device over the network, a set of metadata associated with the image, the set of metadata comprising at least some information derived from one or more mobile applications that are hosted on the user device;

determining, by the processing application of the server device, characteristics of a plurality of text-containing regions of the image received from the user device over the network expense;

forming, by the processing application of the server device, a feature vector comprising at least a portion of the characteristics and at least a portion of the set of metadata associated with the image, the set of metadata derived from the one or more mobile applications and received from the user device over the network; and inputting the feature vector into a predictor at the processing application of the server device to determine at least one predicted merchant name matching identifier based on at least the set of metadata associated with the image, the set of metadata derived from the one or more mobile applications and received from the user device over the network, wherein the at least one predicted matching identifier is identified from a set of identifiers stored in a database coupled to the server device.

19. The system of claim 18,
wherein:

the feature vector does not contain a candidate matching identifier, and the feature vector further comprises at least one of, captured image features, or historical features, or temporal features, or topological features, or preference features, or exogenous features, or any combination thereof, the set of metadata associated with the image comprises at least one of, a set of user credential information, or time information, or global positioning information, or user travel profile information, or user itinerary information, or user mileage tracker information, the user itinerary information is derived from a mileage tracker application running on the user device, the user travel profile information is derived from a travel application running on the user device, determining characteristics of a plurality of text-containing regions of the image, text-containing regions comprising at least one of, an aspect ratio, or a number of a whitespace gutters, or a juxtaposition of whitespace gutters, or a font size, the feature vector further comprises at least some of the candidate matching identifiers and at least a portion of the characteristics of the text-containing regions, the predictor is formed using a model generator and a model validator by implementing a machine learning process including inputting a sequence of vectors into the model generator, the sequence of vectors comprising a codification of a set of features pertaining to one or more previously captured images, the sequence of vectors pertaining to at least one of historical items, temporal features, topological features, preference features, exogenous features, the model generator correlating a first portion of input vectors with known correct results to form a trained predictive model, the model validator uses a second portion of input vectors and a portion of known correct results to validate the trained predictive model to a predetermined level of precision, and the predictor comprising at least the validated trained predictive model, the predictor using a selection technique to reduce a number of identifiers, wherein the selection technique uses information from at least the set of metadata to identify possible matches from a larger set, and the image and the set of metadata is routed through a middleware component to a server having the processing application, the processing application outputting tags generated based on the image, the tags being transmitted to the user device through the middleware component in a markup language document; and further comprising:

comparing the predicted matching identifier to identifiers from a identifier data store to form at least two match score values associated with at least two of the identifiers, selecting one of the identifiers corresponding to one of the predicted matching identifiers, forming a markup language document that comprises at least one of the at least one predicted matching identifier, identifying, from a database of known identifiers, a plurality of candidate matching identifiers based at least in part on the characteristics of the text-containing regions, and generating candidate match scores for at least some of the candidate matching identifiers.

20. The system of claim 18, wherein the set of metadata comprises at least one of, a set of user credential information, or time information, or global positioning information, or user travel profile information, or user itinerary information, or user mileage tracker information, or any combination thereof.

* * * * *

UNITED STATES PATENT AND TRADEMARK OFFICE
CERTIFICATE OF CORRECTION

PATENT NO. : 10,235,720 B2  
APPLICATION NO. : 14/922044  
DATED : March 19, 2019  
INVENTOR(S) : Abraham et al.

Page 1 of 1

It is certified that error appears in the above-identified patent and that said Letters Patent is hereby corrected as shown below:

In the Drawings

On sheet 11 of 19, in FIG. 4B, under Reference Numeral 410, Line 3, delete "dentifier" and insert -- identifier --, therefor.

In the Specification

In Column 6, Line 39, delete "1 C200" and insert -- 1C200 --, therefor.

In Column 6, Line 41, delete "1 C200" and insert -- 1C200 --, therefor.

In Column 9, Line 56, delete "1 C200" and insert -- 1C200 --, therefor.

In Column 11, Line 28, delete "and or" and insert -- and/or --, therefor.

In Column 23, Line 28, delete "eXtensible" and insert -- extensible --, therefor.

In the Claims

In Column 27, Line 19, in Claim 10, delete "candidate-matching" and insert -- candidate matching --, therefor.

In Column 27, Line 25, in Claim 10, delete "candidate-matching" and insert -- candidate matching --, therefor.

In Column 29, Line 50, in Claim 18, delete "network expense;" and insert -- network; --, therefor.

Signed and Sealed this  
Tenth Day of March, 2020

Andrei Iancu  
*Director of the United States Patent and Trademark Office*